(12) United States Patent
Swift et al.

(10) Patent No.: US 8,985,097 B2
(45) Date of Patent: Mar. 24, 2015

(54) BUILDING-INTEGRATED SOLAR THERMAL MICRO-CHANNEL ABSORBER AND METHOD OF MANUFACTURING THEREOF

(76) Inventors: John Swift, King (CA); Anne Swift Hendricks, Mountain View, CA (US)

(*) Notice: Subject to any disclaimer, the term of this patent is extended or adjusted under 35 U.S.C. 154(b) by 0 days.

(21) Appl. No.: 13/088,295

(22) Filed: Apr. 15, 2011

(65) Prior Publication Data

US 2011/0192393 A1 Aug. 11, 2011

(51) Int. Cl.

| | | |
|---|---|---|
| F24J 2/24 | (2006.01) | |
| F24J 2/20 | (2006.01) | |
| F24D 12/02 | (2006.01) | |
| F24J 2/04 | (2006.01) | |
| F24J 2/22 | (2006.01) | |
| F24J 2/46 | (2006.01) | |

(52) U.S. Cl.
CPC . *F24J 2/20* (2013.01); *F24D 12/02* (2013.01); *F24J 2/0444* (2013.01); *F24J 2/045* (2013.01); *F24J 2/202* (2013.01); *F24J 2/22* (2013.01); *F24J 2/24* (2013.01); *F24J 2/4647* (2013.01); *F24J 2/201* (2013.01); *F24D 2200/12* (2013.01); *F24D 2200/14* (2013.01); *Y02B 10/20* (2013.01); *Y02B 10/70* (2013.01); *Y02B 30/14* (2013.01); *Y02E 10/44* (2013.01)
USPC .......... 126/663; 126/270; 126/635; 126/450; 126/271; 136/248

(58) Field of Classification Search
USPC .................. 126/663, 625, 655, 704; 136/248
See application file for complete search history.

(56) References Cited

U.S. PATENT DOCUMENTS

| | | | | | |
|---|---|---|---|---|---|
| 3,450,192 | A | * | 6/1969 | Hay | 165/49 |
| 4,201,193 | A | * | 5/1980 | Ronc | 126/623 |
| 4,677,903 | A | * | 7/1987 | Mathews, III | 454/185 |
| 4,702,227 | A | * | 10/1987 | McElwain | 126/621 |
| 5,415,155 | A | * | 5/1995 | Cohen et al. | 126/663 |
| 5,524,381 | A | * | 6/1996 | Chahroudi | 47/17 |
| 6,148,570 | A | * | 11/2000 | Dinwoodie et al. | 52/173.3 |

(Continued)

FOREIGN PATENT DOCUMENTS

| | | | | | |
|---|---|---|---|---|---|
| GB | 2010467 | * | 5/1978 | | F24J 3/02 |
| WO | WO2007053241 | * | 5/2007 | | B60K 16/00 |

OTHER PUBLICATIONS

Colon, C.J. et al., "Roof Integrated Solar Absorbers: The Measured Performance of "Invisible" Solar Collectors", National Renewable Energy Laboratory, Colorado, Apr. 2001.

*Primary Examiner* — Gregory Huson
*Assistant Examiner* — Nikhil Mashruwala
(74) *Attorney, Agent, or Firm* — Bereskin & Parr LLP/S.E.N.C.R.L., s.r.l.

(57) ABSTRACT

A device and method of its production for a micro-channel thermal absorber to be used as a solar thermal collector, heat collector, or heat dissipater, extruded or continuously cast in one piece or in modular segments from a metal, plastic, or glass and assembled into panels of different structures seamlessly integrated into the envelope of a building as covering layers or structural elements. The micro-channel thermal absorber comprises an active plate, a back plate adjacent to the active plate, and a plurality of micro-channel walls arranged substantially perpendicular to the active plate and the back plate to define a plurality of fluid transport micro-channels configured to allow fluid flow there-along, wherein the micro-channel walls constitute supporting elements between the active plate and the back plate to provide structure.

17 Claims, 12 Drawing Sheets

(56) References Cited

U.S. PATENT DOCUMENTS

| | | |
|---|---|---|
| 7,886,537 B2* | 2/2011 | Jagusztyn et al. ......... 60/641.15 |
| 8,347,877 B2* | 1/2013 | Shabtay et al. ............... 126/664 |
| 2004/0261787 A1* | 12/2004 | Rekstad ........................ 126/635 |
| 2005/0061312 A1* | 3/2005 | Szymocha .................... 126/643 |
| 2005/0126615 A1* | 6/2005 | Bell ............................. 135/33.2 |

* cited by examiner

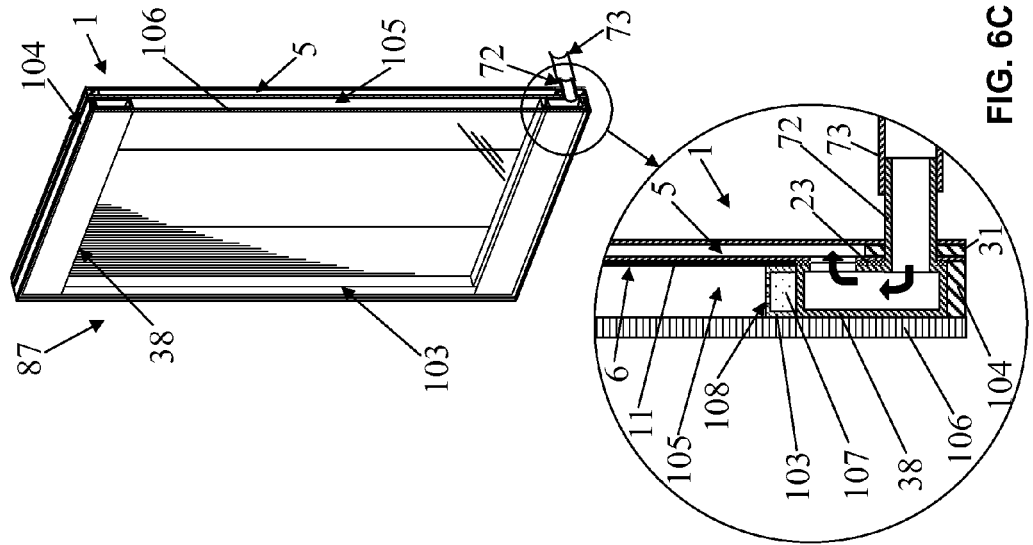
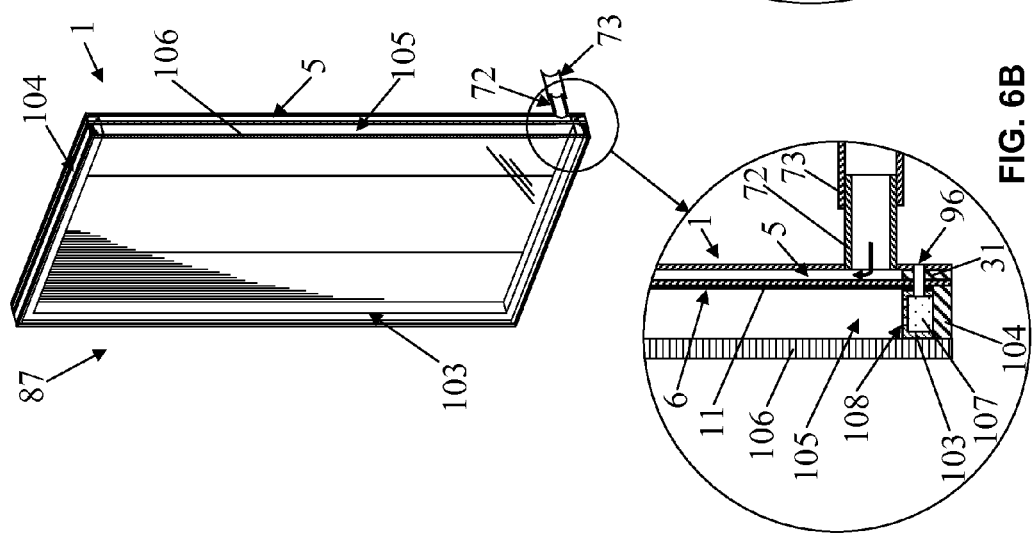
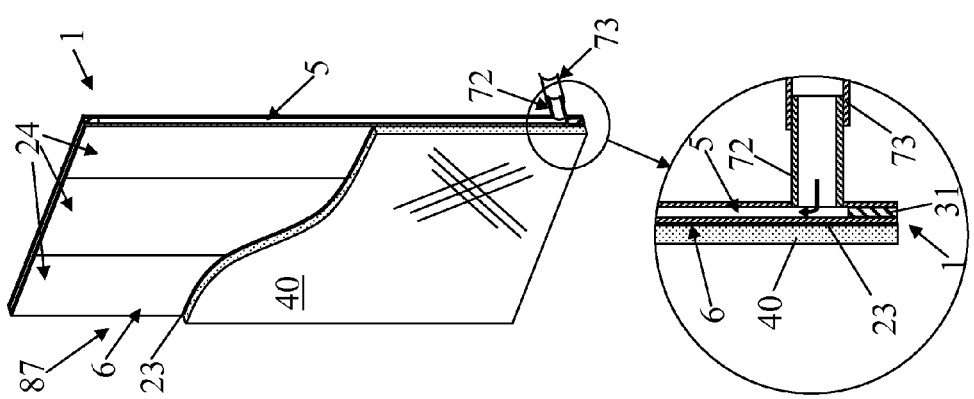
FIG. 6A
FIG. 6B
FIG. 6C

BUILDING-INTEGRATED SOLAR THERMAL MICRO-CHANNEL ABSORBER AND METHOD OF MANUFACTURING THEREOF

STATEMENT OF RELATED APPLICATION

This application claims the benefit of priority to PCT application Serial No. PCT/US2008/080005, having an international filing date of Oct. 15, 2008, the disclosure of which is hereby incorporated by reference in its entirety.

TECHNICAL FIELD

The subject matter described herein relates to solar thermal collectors.

BACKGROUND

The sun's thermal energy has been used for thousands of years to provide hot water and heat. Three major limitations of contemporary solar thermal systems prevent their widespread adoption as an alternative to fossil fuels: collector aesthetics, costs of the system (including collectors and installation), and limited functionality of the thermal collectors. One of the most significant barriers to adoption cited by architects, developers, and property owners is the unsightliness of current thermal collectors are that they are "boxed" so that they cannot be seamlessly integrated as part of the architecture or structure of a building. The construction of contemporary solar thermal collectors and the requirement that they be installed to obtain the best solar exposure, limits their installation mainly to the roofs of buildings, thus confining their area and thermal capacity.

Another barrier to adoption of current solar thermal technologies is their high cost. The high cost of the collectors can be attributed to the costs of raw materials (copper, aluminum, and stainless steel) and to the current production process of typical "plate and tubes" solar collectors, which uses labor-intensive techniques that are difficult to automate. The high costs of materials and labor motivate manufacturers to experiment with the use of less expensive plastic absorbers in flat-plate solar collectors. However, inexpensive plastic absorbers are unsuitable in glazed flat-plate solar collectors because of their low softening temperature. Some costly plastic materials are able to satisfy the temperature requirements for glazed flat-plate solar collectors, but the high cost of these plastic materials diminishes their advantage over metal absorbers. The high costs of installation of the solar thermal system results from treating the system as an add-in to the existing building structure. This requires the use of additional materials and labor to install the system.

Finally, the collectors function only as elements of the solar thermal system with no other structural or functional purposes. If the collectors are integrated into the external envelope of a building, doubling as a cladding system and covering a substantial part of the envelope, they can also limit solar gains to the building and dramatically lower the costs of cooling the building's interior. Additional benefits can be derived from the system if it can be used at night to dissipate excess of energy. The relative cost of the installation can be lowered if the solar collectors are used as structural elements of a building envelope or function as cladding, thus decreasing the cost of the system as a share of the overall cost of the building. The savings arising from less expensive materials, production methods, and installation would provide a stronger economic incentive for the use of solar thermal systems.

Despite their potential for energy conservation, contemporary solar thermal systems have remained mostly in separate domains from other thermal systems used in a building. The integration of these separate systems into a single comprehensive system built directly into the structure of a building can offer substantial monetary and energy savings.

SUMMARY

This following discloses components and a system for a comprehensive building thermal energy management that solves the three major problems encountered with existing solar thermal installations. The following description uses a novel solar thermal micro-channel absorber, innovative manifolds, and methods for installation of the micro-channel absorber device, as well as a system for managing the distribution of thermal energy throughout the building. The disclosed components and system offer substantial cost savings, energy savings, and superior thermal performance over existing solutions.

In an aspect, the micro-channel absorber includes an active plate, a back plate being adjacent to the active plate, and a plurality of micro-channel walls arranged between the active plate and the back plate to create fluid transport micro-channels, thus forming a continuous fluid jacket adjacent to the active plate. The parallel micro-channel walls constitute supporting elements between the active plate and the back plate, providing a strong and rigid lightweight structure. The micro-channel absorber offers significant improvements in thermal efficiency by using a continuous fluid jacket adjacent to the surface of the active plate, thus providing a large active area of heat exchange and maintaining a uniform temperature across the whole active surface without temperature peaks that occur in-between the tubes of current "plate and tubes" solutions. Additionally, micro-channels with a very small channel height and a small cross-sectional area, combined with a proper adjustment of the flow of the heat-transfer fluid, eliminate the problem associated with the large heat capacity of other contemporary continuous fluid jacket designs.

The temperature of the active surface (the solar absorption surface) of the micro-channel absorber is lower than the averaged temperature of the solar absorption surface of a comparable "plate and tubes" solar thermal absorber. This lower temperature of the active surface increases the thermal efficiency of the micro-channel absorber by decreasing thermal losses caused by re-radiation of solar energy from the active surface back to the surroundings. Apart from collecting solar energy, large areas of panels made of the micro-channel absorbers integrated into a building's envelope also remove a substantial part of the solar heat load, thus reducing the solar heat gains of the interior space and lowering the amount of energy required to cool the interior. Additionally, the same panels can dissipate heat during the night or when the external temperature is lower than the required internal temperature, further conserving the energy required for cooling.

The micro-channel absorber is made of metal, metal alloy, plastic, plastic composite, or glass, using relatively inexpensive, scalable, and easy to automate high volume manufacturing methods of extrusion or continuous casting to decrease the costs of production relative to those of current "pipes and tubes" collectors. By forming the entire body of the micro-channel absorber as one structure, the extrusion and continuous casting processes can produce micro-channel absorbers of exceptional strength, which can withstand the damaging forces of thermal movements of large area installations and the high pressure of the heat-transfer fluid. Both of these manufacturing methods allow for the production of micro-channel absorbers of considerable length and discretionary width made either in one part (for limited-width exchangers) or in modular sections that allow for the assembly of the micro-channel absorber to any width specifications. With contemporary standard solar collectors, the size of the collector is restrictive and it is difficult to match the size of a collector with the surface grid of a building. Producing the micro-channel absorber in modular sections also lowers the cost of manufacturing by allowing for the use of smaller manufacturing equipment, such as smaller extrusion presses. These methods of production also provide standardized micro-channel absorbers that are identical in dimensions and physical attributes.

The micro-channel absorber's lightweight, flat and thin construction allows for the absorber to be mounted under a layer of covering materials anywhere on the building's external envelope, thus providing the benefits of aesthetic appeal by concealing the installation and providing additional structural support while minimizing the exposure of micro-channel absorbers to the elements. Although some efficiency losses may occur from mounting the micro-channel absorber under covering materials, the large area of the micro-channel absorber installations and the high thermal efficiency of the micro-channel absorbers more than compensates for such losses. For example, in the case of solar thermal collectors, a typical insolated area of an external envelope of a building covered by integrated micro-channel absorbers can easily provide significantly more thermal energy than high efficiency contemporary solar thermal collectors installed only in roof arrays. Furthermore, if the micro-channel absorbers in large area embodiments are glazed, or if there is no layer of a covering material such that the active surface functions as the external cladding surface, the efficiency of the micro-channel absorbers exceeds the efficiency of corresponding contemporary "plate and tubes" solar collectors and the solar energy collected from such a system is an order of magnitude larger than the energy collected by contemporary solar thermal collectors installed only in a roof arrays. Also, the thin, lightweight, rigid and durable structure of the micro-channel absorber makes the absorbers ideal for use as elements of external cladding systems.

The present disclosure describes micro-channel absorbers in thin and thick panel structures, where thin panels comprise of the micro-channel absorber and where thick panels have a sandwich structure comprising of the micro-channel absorber, a reinforcement core layer such as a honeycomb structure, and a back sheet. In the thick panel, the additional core layer and back sheet create a structural composite cladding configuration that is capable of bearing considerable loads. Each of the two groups of panels are further divided into the following configurations: (a) bare, where the active surface of the micro-channel absorber is with or without optically selective coating, (b) covered, where the micro-channel absorber has a layer of covering material secured over the active surface, and (c) glazed, where the micro-channel absorber is combined with a layer, or layers, of glazing, separated from the active surface by an air gap. The panels may be mounted on a building envelope as cladding, and architectural and structural elements. Thus, the solar collectors are no longer add-in elements, but become an integral part of the building structure, particularly for curtain walls, external wall cladding, and external wall insulation systems.

The thin construction of the micro-channel absorbers makes them especially suitable for retrofits and, when solar thermal function is combined with other structural functions of a building, the relative cost of the retrofit will be significantly lower. As an example, if a building façade is resurfaced and micro-channel absorbers are used as both the substrate for applying stucco and solar thermal collectors, the cost of the solar thermal system will decrease significantly because the exchanger will serve a dual purpose and require only a one-time expenditure on labor.

The building thermal energy management system disclosed herein combines micro-channel absorbers with conventional sources of heat and cold to meet varying thermal requirements of a building. The system allows for collecting solar energy, limiting solar gains to the building, storing and dissipating excess energy, providing energy for heating and cooling functions, and synchronizing the work of solar and conventional sources of thermal energy. The control unit directs the entire system, including the use of different zones of solar collectors depending on levels of insulation, external temperature, and the required internal temperature. The building thermal energy management system offers joint use functions, thus providing better economy and larger energy savings than stand-alone solar thermal and heating and cooling systems.

Contemporary solar thermal systems cannot achieve all of the additional functions and benefits of the micro-channel absorbers in disclosed configurations beyond the collection of solar energy. The adaptability of the micro-channel absorber to various functions and uses offers economies of scale of production and installation in the solar and energy conservation industries, and allows for the modularization of different system elements. This, in turn, provides a stronger economic incentive for the use of solar thermal systems in residential, commercial, and industrial applications.

The above summary is not intended to describe each disclosed embodiment and the various embodiments and examples are described below.

BRIEF DESCRIPTION OF THE FIGURES

The accompanying drawings, which are incorporated into and constitute a part of this specification, illustrate one or more examples of embodiments and, together with the description of example embodiments, serve to explain the principles and implementations of the embodiments.

FIGS. 6A-6C show perspective cutaway views and cross-section views of embodiments incorporating the micro-channel absorber in the thin panel structure with different covering material configurations according to an embodiment.

DETAILED DESCRIPTION

Figure 1:
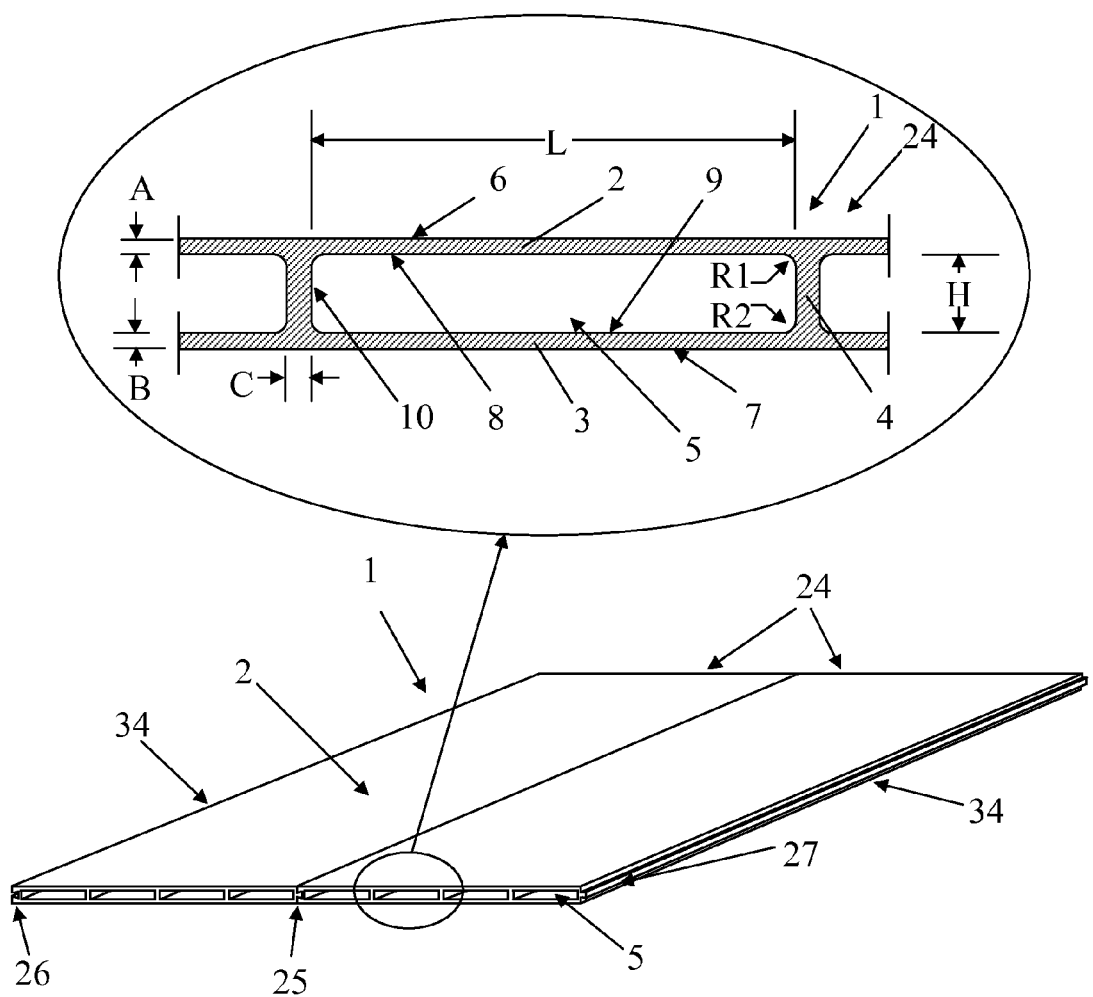
FIG. 1 shows a perspective view and a schematic cross-section of the micro-channel absorber assembled from modular sections according to an embodiment.
Figure 2:
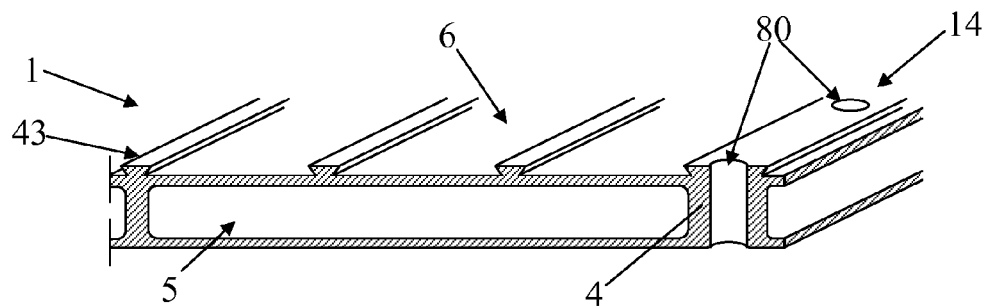
FIG. 2 shows a cross-section of the micro-channel absorber with anchors extruded as an integral part of the active surface and mounting holes located in pierce-able areas according to an embodiment.

FIG. 1 shows a simplified perspective view of an embodiment of the body of micro-channel absorber 1 assembled from modular micro-channel sections 24 and in the insert shows a schematic cross-section through the structure of the micro-channel absorber 1 in accordance with an embodiment. The structure of the micro-channel absorber 1 preferably includes an active plate 2, a back plate 3 being adjacent to the active plate 2, with substantially parallel micro-channel walls 4 arranged substantially perpendicularly between the active plate 2 and the back plate 3. Fluid transport channels 5 are defined between the micro-channel walls 4 and between the active plate 2 and the back plate 3. The micro-channel walls 4 constitute supporting elements between the active plate 2 and the back plate 3, form the fluid transport channels 5, and function as thermal fins that enhance heat transfer between the active plate 2 and the heat-transfer fluid flowing in the fluid transport channels 5. The two plates 2 and 3 connected by the micro-channel walls 4 provide a strong and rigid structure. The stiffness of the body of the micro-channel absorber 1 allows it to be used as a distinctive structural building element withstanding considerable loads and be capable of strongly supporting a layer of covering material integrated with the micro-channel absorber 1. As seen in the cross-section view of the structure of the micro-channel absorber 1, all of the micro-channel walls 4 are preferably parallel, at equal intervals and with equal thicknesses, and preferably all of them stand perpendicularly to plates 2 and 3. However, one or more of these characteristics can be varied: some or all of the intervals can be different from each other, one or more wall thicknesses may be different (as shown in FIG. 2), and one or more walls may not necessarily be perpendicular to plates 2 and/or 3. Also, active plate 2 and/or back plate 3 may not be flat and active plate 2 may not be parallel to back plate 3.

The fluid transport channels 5 are configured to allow a heat-transfer fluid to flow all the way through the length of the micro-channel absorber 1. The fluid transport channels 5 preferably cover the whole area adjacent to the active plate 2 constituting a continuous fluid jacket adjoining the active plate 2. The heat-transfer fluid used with the micro-channel absorber may be a liquid such as water, brine, or any liquid with an appropriate chemical compound for heat transfer. It is contemplated that the heat-transfer fluid may be air or any other appropriate type of heat transfer gas. It is also contemplated that a suspension in liquid or in gas may be used as the heat-transfer fluid. Further, it is contemplated that the heat-transfer fluid may be interchangeably a liquid or a gas depending on the cycle of operation of the micro-channel absorber 1.

The micro-channel absorber 1 may be fabricated as one section of the required width or assembled from modular micro-channel sections 24 that allow for the assembly of the micro-channel absorber 1 to any width specifications, as depicted in this embodiment. It is contemplated that the micro-channel absorber 1 is made of metal, metal alloy, plastic, plastic composite, glass, or combinations of these materials using relatively inexpensive, scalable, and easy to automate high volume manufacturing methods of extrusion or continuous casting. The extrusion and continuous casting processes can produce micro-channel absorbers 1 of exceptional strength because the entire body of the micro-channel absorber 1 is formed in a continuous process as one consistent structure.

When the micro-channel absorber is extruded or continuously cast, the extrusion or casting nozzles are constructed depending on the requirements for the micro-channel absorber's 1 use. The following features for increasing the efficiency of heat exchange can be achieved in any combination: (a) the active surface 6 of the micro-channel absorber 1 is formed flat with smooth or roughened surface (roughness increases the bonding of a covering material); (b) the active surface 6 of the micro-channel absorber 1 is formed with parallel small grooves or fins to increase the absorption of solar radiation; (c) the active surface 6 of the micro-channel absorber 1 is formed with parallel anchors to increase the strength of bond with the layer of a covering material (as described in FIG. 2); (d) the channel top surface 8 and channel wall surfaces 10 (depicted as the heat transfer surface 12 in FIG. 3) inside the fluid transport channels 5 are formed rough and without or with small groves or fins to improve the process of the heat transfer from these surfaces to the heat-transfer fluid; (e) the micro-channel's bottom surface 9 is formed smooth to decrease heat losses through the back plate 3 of the micro-channel absorber 1 by reflecting thermal radiation and promoting laminar flow of the heat-transfer fluid in the layers in the vicinity of the bottom surface 9; (f) the back surface 7 of the micro-channel absorber 1 is formed as a smooth surface to minimize heat losses through radiation or is formed as a rough surface to increase bond strength in the case of optional bonding of the back surface 7 to a substrate or insulation layer by an adhesive. The methods are not limited to the examples described above, but rather are described to illustrate possible methods of manufacturing the micro-channel absorber. It should be noted that other appropriate methods of manufacturing are contemplated.

The depicted in FIG. 1, micro-channel sections 24 are preferably interlocked together along their elongated section edges 34 using a "tongue and groove" interlocking fasteners 25 (in this embodiment shown as dovetail fasteners). Each modular micro-channel section 24 in the embodiment has one edge in the shape of a female interlocking fastener 26 and the other edge in the shape of a male interlocking fastener 27. The male interlocking fastener 27 of one modular micro-channel section 24 preferably interlocks into the female interlocking fastener 26 of the next modular micro-channel section 24 to create one homogeneous micro-channel absorber 1. This embodiment allows for constructing micro-channel absorbers 1 of discretionary width (due to the use of the interlocking micro-channel sections 24) and length (due to the use of a continuous forming process). However, this embodiment should not limit other possible methods of fastening together the elongated section edges 34, including self-locking joints, flush type joints connected by means of gluing or welding, or any other practical mechanical means. Also, the elongated section edges 34 of the micro-channel absorber 1 can be extruded without interlocking fasteners 25 and each of the modular micro-channel sections 24 may be held in place to constitute the micro-channel absorber 1 by integration with manifolds, fastening to a substrate, or integration by the use of a layer of covering material (as described later).

FIG. 1, in the insert, shows the preferable geometry and dimensions of the fluid transport channels 5 of the micro-channel absorber 1 in accordance with an embodiment. The width L of the fluid transport channels 5 is considered to be in the range between and including 4.0 mm and 60.0 mm, but preferably between 5.0 mm and 30.0 mm, although other dimensions are contemplated. The height H of the fluid transport channels 5 is considered to be in the range between and including 1.0 mm and 15.0 mm, but preferably between 2.0 mm and 10.0 mm; however, other dimensions are also contemplated. The thickness A of the active plate 2 is considered to be in the range between and including 0.2 mm and 5.0 mm, but preferably between 0.2 mm and 1.5 mm. The thickness B of the back plate 3 is considered to be in the range between and including 0.2 mm and 5.0 mm, but preferably between 0.2 mm and 1.5 mm, although other dimensions are contemplated. In the case of the back plate 3 made of plastic, the thickness B is contemplated to be larger than in metal embodiments to provide additional stiffness and thermal insulation. For thermal and structural requirements, the thickness C of the micro-channel wall 4 is considered to be in the range between and including 0.3 mm and 15.0 mm, but preferably between 0.4 mm and 1.5 mm. However, other thicknesses are also considered.

In an embodiment, the terminal micro-channel walls 4 at the external edges of the extruded body of the micro-channel absorber 1 may be thicker than the rest of the micro-channel walls 4. Also, when the micro-channel absorber 1 is mounted to its substrate by fasteners going through the body of the micro-channel absorber 1 (as described in FIG. 2), the thickness C of certain micro-channel walls 4 may be much larger than thickness of the rest of the micro-channel walls 4 in the micro-channel absorber 1 to create pierce-able areas suitable to accommodate fasteners (as screws or nails) penetrating through the body of the micro-channel absorber 1.

The micro-channel wall 4 works as a thermal fin for the active plate 2. The radius R1 increases thermal conduction between the active plate 2 and the micro-channel wall 4, which is advantageous for the system, thus it is contemplated that R1 can have value in between zero and H. The same micro-channel wall 4 works as a thermal fin for the back plate 3, conducting heat to the back plate 3, and causing loss of energy from the back surface 7 through conduction, convection, and radiation. To minimize these losses, the radius R2 is preferably as small as possible to minimize the thermal bridge effect.

FIG. 2 depicts a cross-section of an embodiment of the micro-channel absorber 1 where anchors 43 are extruded as an integral part of the active surface 6 in the direction parallel to the walls 4 of the fluid transport channel 5. The anchors 43 provide additional strength to the bond between the body of the micro-channel absorber 1 and a layer of covering material (such as stucco or stone veneer) applied on or adhered to the active surface 6 of the micro-channel absorber 1.

FIG. 2 also depicts pierce-able areas 14, which may have mounting holes 80 predrilled, needed for securing the micro-channel absorber 1 to a substrate by using fasteners, preferably screws or nails. The pierce-able areas 14 may be also used when a layer of covering material is applied on top of the micro-channel absorber 1 and the covering material has to be secured through the body of the micro-channel absorber 1 to the underlying substrate (as in the case of roof coverings using asphalt shingles). When the anchors 43 are used as an integral part of the active surface 6, it is contemplated to combine the location of the anchors 43 with the location of the pierce-able areas 14 (as shown here) providing thicker layer of material where fasteners are located, and by that adding strength to bonds to the substrate. In this case the width of the anchors may be equal to the width of the pierce-able areas 14 (or smaller) and the anchors also mark the location of the pierce-able areas 14.

There are two approaches contemplated for the preparation of the pierce-able areas 14. The first approach (depicted here) is to extrude the micro-channel absorber 1 with certain micro-channel walls 4 much wider than the regular micro-channel walls 4 between the transport channels 5 to accommodate piercing by fasteners or drilling the mounting holes 80. The second approach is to use regular thickness of the micro-channel walls 4 and to create the pierce-able area 14 by blocking the fluid flow through certain fluid transport channels 5. It is contemplated that blocking members, such as a material deposited in the fluid transport channels 5, are used to hermetically block the flow in one or a few adjacent fluid transport channels 5 that are located in the areas where fasteners have to go through the body of the micro-channel absorber 1. Due to the modularity of the elements used in building's construction, it is possible to place the pierce-able areas 14 or mounting holes 80 precisely at the intervals needed for the installation of future fasteners. There are also pierce-able areas 14 located at the ends of the micro-channel absorber 1, where the micro-channel end openings are sealed by blocking members (as described later).

Figure 3:
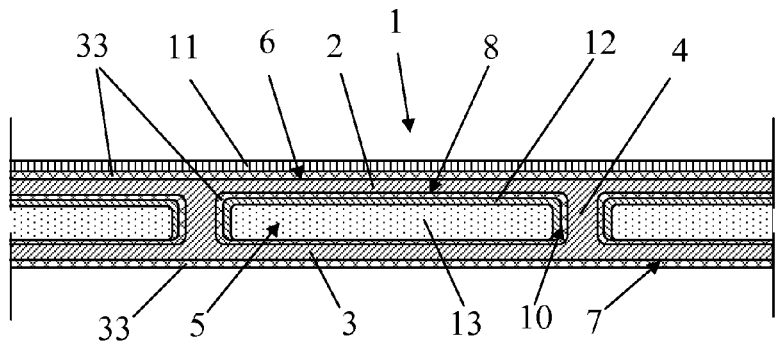
FIG. 3 shows a schematic cross-section of the micro-channel absorber with layers of coating applied to the micro-channel absorber according to an embodiment.

FIG. 3 shows a schematic cross-section of the structure of the micro-channel absorber 1 which is extruded or made by continuous casting in an embodiment using a metal or metal alloy (in this embodiment an aluminum alloy) with layers of coating applied to the body of the micro-channel absorber 1. The figure is provided as a base for descriptions and should not be limiting, which also considers different materials for extrusion of the micro-channel absorber's 1 body and different methods of production. For simplicity and clarity of the drawings, and not to be limiting, the exchange efficiency enhancement elements (small grooves and fins) described in FIG. 1 and anchoring elements described with FIG. 2 are not shown here.

In an embodiment, the entire body of the micro-channel absorber 1 is anodized covering all surfaces by a metal alloy oxide layer 33 to increase corrosion resistance against external elements and the heat-transfer fluid 13, to increase surface hardness, to increase wear resistance, to provide better adhesion for other layers, and to improve lubrication when the interlocking fasteners are used.

The active surface 6 of the micro-channel absorber 1 can be covered by a layer of a covering material (described in FIG. 6A as the covered configuration), or can be exposed directly to sunrays, without any layer of covering material (described in FIG. 6A as the bare configuration) or under glazing (described in FIGS. 6B and 6C as the glazed configuration). The layers of coating applied to the active surface 6 depend on the configuration in which the micro-channel absorber 1 is to be used.

When the micro-channel absorber 1 is used without a layer of covering material or under glazing, an optically selective coating 11 is preferably applied directly on the anodized active surface 6, although not necessarily. Solar irradiance is absorbed by the optically selective coating 11 and converted into thermal energy. The optically selective coating is highly absorptive of short-wavelength (visible) light but is a poor emitter of long-wavelength radiant energy. Different optically selective coatings may be used: (a) galvanic spectrally selective coatings, such as black chrome, black nickel, or black aluminum oxide, (b) selective paints, such as Solarect-Z™ developed at the National Institute of Chemistry in Ljubljana, Slovenia, (c) selective coatings formed by multiphase nano-crystallization process, such as Crystal Clear™ developed by Thermafin Holdings, LLC, USA, and (d) selective coatings formed by vacuum sputtering, such as TiNOX™ developed by TiNOX GmbH. These coatings are provided here as examples, other coatings are also contemplated.

When the micro-channel absorber 1 is used without any layer of covering material (including glazing) the anodized active surface 6 may be left without any additional coating, or may be coil coated or painted. When the micro-channel absorber 1 is used with a layer of covering material, the active surface 6 is left anodized.

The heat transfer surface 12 provides a means to maximize heat transfer rate between the channel top surface 8 (being the underside of the active plate 2), the micro-channel walls 4 (functioning as thermal fins transferring heat from the active plate 2), and the heat-transfer fluid 13. This may be accomplished by increasing the contact area using small surface grooves or surface fins described in FIG. 1 (not depicted here). The heat transfer surface 12 is depicted as an additional layer deposited on the channel top surface 8 and the channel wall surface 10. This simplification is only for the purposes of demonstration. When embodied, the heat transfer surface 12 may simply be a roughened surface of the channel top surface 8 and the channel wall surface 10. Roughened surfaces increase the efficiency of heat exchange by increasing the surface area and by breaking layers of laminar flow close to the heat-transfer surface 12 of the fluid transport channels 5. The roughness of the channel top surface 8 and the channel wall surface 10 can be achieved by, for example, (a) the extrusion tool, (b) machining after the extrusion, and (c) depositing a surface coat.

In an embodiment of the micro-channel absorber 1 made of a plastic or a plastic composite, the optically selective coating 11, as well as paint, can be applied to the active surface 6, and the heat transfer surface 12 can be arranged as described above. It is contemplated that particles of a highly heat conductive metal or elements made of a highly heat conductive metal (such as metal thread or mesh) can be incorporated into the plastic or the plastic composite to increase thermal conductivity of the active plate 2 and the micro-channel walls 4. Also, a layer of metal foil (such as aluminum foil) may be adhered to the back surface 7 of the back plate 3, or the back surface 7 can be metalized, to reflect thermal radiation from the back surface 7 of the micro-channel absorber 1 back to the micro-channel absorber 1.

FIGS. 4A-4E show embodiments of remote manifolds 44, internal manifolds 22, and external manifolds 38 used with the micro-channel absorber 1. A micro-channel panel may be constituted by an assembly of the micro-channel absorber 1 (fabricated as one section of the required width or assembled from modular micro-channel sections 24) with a means of facilitating flow of heat-transfer fluid through all of the fluid transport channels 5 in the micro-channel absorber 1 and facilitating communication of all of the fluid transport channels 5 with the balance of the system. The means include, but are not limited to, remote manifolds 44, internal manifolds 22, external manifolds 38, and/or fluid ports for serpentine configuration (explained in FIG. 5B). Each panel preferably has a distribution and a collection manifold (for example, in the case of the serpentine configuration, which does not require manifolds, there is one fluid port for distribution and one fluid port for collection of the heat-transfer fluid). The small thickness of the micro-channel panel, as well as the elimination of obstruction of the active surface of the micro-channel panel, allows for the micro-channel panel to be seamlessly integrated into a building's envelope, especially as a retrofit. Remote manifolds 44 and external manifolds 38 are preferably made of metal and/or metal alloys, plastic and/or plastic composites, and/or combinations thereof. Also, it is contemplated that the materials used in the manifolds may be the same or different as the materials used in the micro-channel absorber 1.

Figure 4A:
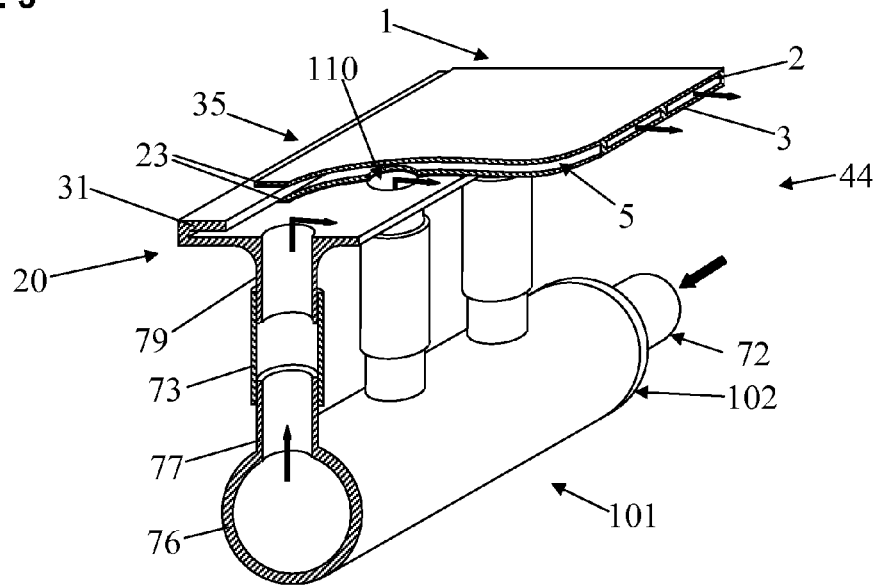
FIG. 4A shows a perspective cutaway view of the remote manifold with the manifold plate with integrated blocking members according to an embodiment.

FIG. 4A shows a perspective cutaway view of an embodiment of the remote manifold 44. Each remote manifold 44 preferably includes the manifold body 101, the manifold plate 20, and connecting pipes 73. The manifold body 101 is composed of a round or rectangular tube 76 closed at both ends by end walls 102 with plurality of tubular manifold connectors 77 integrated with the wall of the tube 76 and at least one fluid port 72 (more than one fluid port 72 may be integrated into the manifold body 101 to provide means to assemble micro-channel panels into groups of parallel panels) embodied as a tubular connector preferably integrated with the end wall 102 (as shown) or the wall of the tube 76 being in communication with the balance of the system and functioning as fluid inlet (or fluid outlet) for the micro-channel panel. The interiors of the manifold connectors 77 and the fluid port 72 are in communication with the interior of the tube 76. In an embodiment, the manifold connectors 77 and the fluid port (or ports) 72 are integrated with the manifold body 101 by any practical means (e.g. welding, gluing, pulling from the tube's 76 walls, using threads, or any other mechanical means). Alternatively, the entire manifold body 101, the manifold connectors 77, and the fluid port (or ports) 72 are integrally cast as one structure using metal, metal alloy, plastic, or plastic composite. The manifold connectors 77 are shown in the drawing as perpendicular to the axis of symmetry of the tube 76; however, one or more of the manifold connectors 77 may be attached to the manifold body 101 from any direction and at any angle. The fluid port 72 is depicted as integrated at a right angle with the end wall 102; however, the fluid port 72 can be attached to the manifold body 101 from any direction and at any angle.

FIG. 4A further shows the body of the manifold plate 20 combined with the blocking member 31. The blocking member 31 is configured to be inserted into the micro-channel end openings 35 to seal the fluid transport channels 5 of the micro-channel absorber 1 and to support the coupling (to provide an additional mechanical bond) of the manifold plate and the micro-channel absorber 1. The whole manifold plate 20, including the channel connectors 79, is preferably cast as one structure using metal, metal alloy, plastic or plastic composite. The channel connectors 79 are shown in the drawing as perpendicular to the plane of the manifold plate 20; however, the channel connectors 79 can be attached to the manifold plate 20 from any direction and at any angle. Before the manifold plate 20 is attached to the micro-channel absorber 1 the channel connectors 79 of the manifold plate 20 are aligned to openings 110 prepared in the body of the micro-channel absorber 1 to provide communication between the interior of the channel connectors 79 and the interior of the fluid transport channels 5 of the micro-channel absorber 1. The manifold plate 20 is attached preferably using adhesive 23 to the end of the micro-channel absorber 1 and may be additionally secured by welding or fasteners (as rivets) or other mechanical means (not depicted here). The fasteners are contemplated to be placed in mounting holes of pierce-able areas as described previously. However, in an embodiment, the manifold plate 20 can be attached only by use of mechanical means, where gaskets seal the connection between the body of the micro-channel absorber 1 and the body of the manifold plate 20. It is also contemplated in an embodiment that the entire manifold plate 20 is formed by direct casting of the manifold plate's 20 structure over the micro-channel end openings 35 of the micro-channel absorber 1 (cast over method) using metal, metal alloy, plastic, or plastic composite.

In an embodiment, the manifold plate 20 includes a flat strip of material constituting the body of the manifold plate 20 with tubular channel connectors 79 that are integrated into the body of the manifold plate 20 wherein the internal space of the channel connectors 79 extends through the body of the manifold plate. It is also contemplated that the channel connectors 79, being the part of the remote manifold 44, are integrated directly into the back plate 3, active plate 2, and/or the micro-channel end openings 35 by any practical means without use of the manifold plate 20.

The manifold plate 20, or a portion thereof, can also be used with the fluid port 72 of the internal manifolds or of the serpentine flow configuration (described later) due to the mechanical support that the body of the manifold plate 20 provides to a stand alone tubular connector.

The connecting pipes 73 are preferably elastic and are removeably coupled to the manifold connectors 77 and to the corresponding channel connectors 79. In an embodiment, the connecting pipes 73 may be of considerable length and elasticity to accommodate remote positioning of the manifold body 101 from channel connectors 79 which are attached to the micro-channel absorber 1.

Figure 4B:
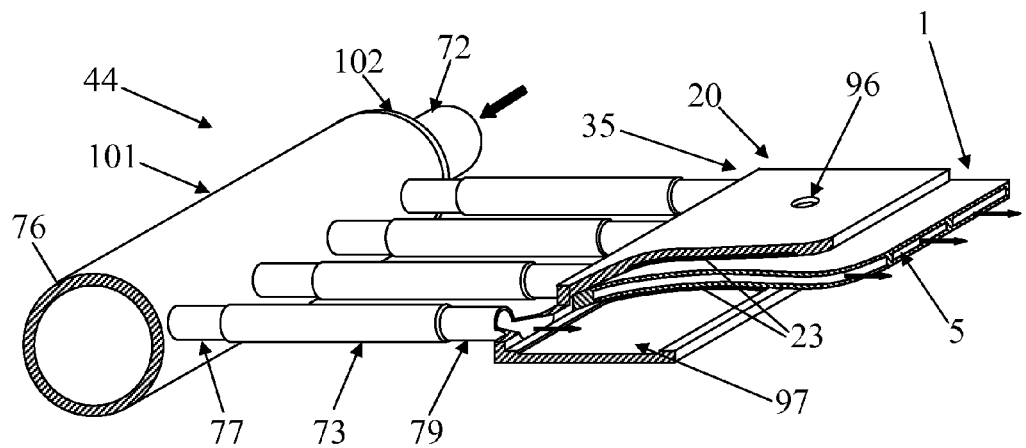
FIG. 4B shows a perspective cutaway view of the remote manifold with the manifold plate having a U-shaped cross-section according to an embodiment.

FIG. 4B shows a perspective cutaway view of an embodiment of the remote manifold 44 with the manifold body 101, connecting pipes 73 (as described in FIG. 4A), and a manifold plate 20 having a U-shaped cross-section. In this embodiment, the channel connectors 79 are integrated into the wall of the U-shaped manifold plate that closes the micro-channel end openings 35. The U-shaped manifold plate 20 encompasses the micro-channel end openings 35 and an adhesive 23 is preferably injected through the apertures 96 to the adhesive cavities 97, thereby hermetically sealing the connection between the manifold plate 20 and the body of the micro-channel absorber 1. It is contemplated, however, that other practical means of coupling the manifold plate 20 to the micro-channel openings 35 are used to form the hermetic seal between the manifold plate 20 and the body of the micro-channel absorber 1. The adhesive 23 is disposed in the adhesive cavities 97 to ensure unobstructed communication between the interior of the channel connectors 79 and the interior of the fluid transport channels 5. However, instead of using adhesive 23, use of a combination of a gasket and mechanical means to secure and seal the U-shaped manifold plate 20 to the body of the micro-channel absorber 1 is also contemplated. Preferably the entire manifold plate (including the channel connectors 79) is cast as one structure using metal, metal alloy, plastic, or plastic composite. It is also contemplated that the entire manifold plate 20 is formed by direct casting of the manifold plate's 20 structure over the micro-channel end openings 35 of the micro-channel absorber 1 (cast over method) using metal, metal alloy, plastic, or plastic composite.

The figures show the channel connectors 79 parallel to the fluid transport channels 5. However, the channel connectors 79 can be attached to the wall of the U-shaped manifold plate 20 that closes the micro-channel end openings 35 from any direction and at any angle. The U shape provides additional stiffness to the micro-channel absorber 1 especially when the micro-channel absorber 1 is assembled from modular micro-channel sections. It is also contemplated in an embodiment, that the channel connectors 79 are integrated perpendicular or at any angle to the wall of the U-shaped manifold plate 20, which is parallel to the plane of the absorber and the micro-channel absorber 1 has openings 110 in its body matching channel connectors 79 of the manifold plate 20 (as described in FIG. 4A), to provide communication between the channel connectors 79 and the fluid transport channels 5 of the micro-channel absorber 1.

Figure 4C:
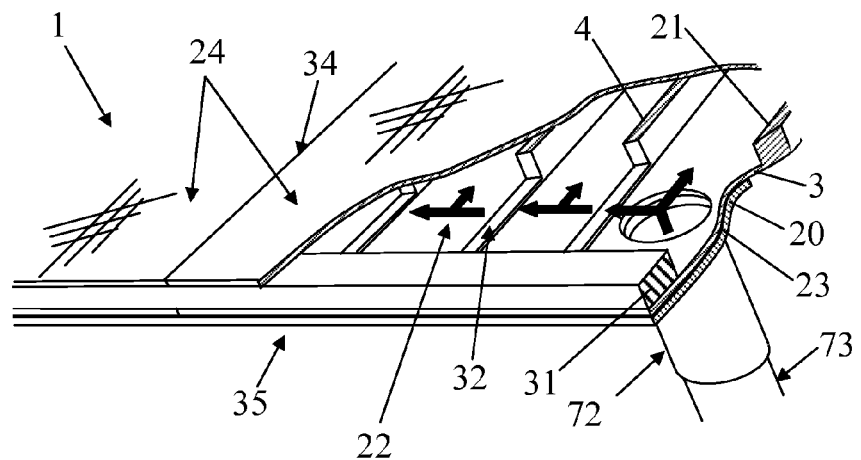
FIG. 4C shows a perspective cutaway view of the internal manifold according to an embodiment.

FIG. 4C shows a perspective cutaway view of an embodiment of the internal manifold 22 formed in the body of the micro-channel absorber 1 by the rearrangement of micro-channel walls 4 and use of the blocking member 31. The internal manifold 22 is preferably created by: (a) removing a part of the micro-channel walls 4 of each of the modular micro-channel sections 24 to create inter-channel openings 32, thereby leaving intact the terminal micro-channel walls 21 (located at the terminal elongated section edges 34 of the micro-channel absorber 1), (b) installing blocking member 31 to hermetically seal the micro-channel end openings 35, and (c) integrating at least one fluid port 72, functioning as the fluid inlet (or fluid outlet) into the internal manifold 22. It should be noted that this method of creating the manifold 22 is an example and thus not limiting.

The fluid ports 72 (for fluid inlet and fluid outlet) for two internal manifolds 22 located on both ends of the micro-channel absorber 1 are preferably located on the diagonally opposite ends of the micro-channel absorber 1, although not necessarily. The fluid port 72 is attached to the body of the micro-channel absorber 1, with or without the use of a manifold plate 20 (depicted here as attached to the back plate 3 using the manifold plate 20 to provide a strengthening structure to support the fluid port 72). In the depicted embodiment, the manifold plate 20 is attached by adhesive 23 to the back plate 3 and may be additionally or alternatively secured by mechanical means such as rivets or other practical means (not depicted). It is also contemplated that the manifold plate 20 is secured only by mechanical means with the use of a gasket. The connecting pipe 73 is attached to the fluid port 72 to link the micro-channel absorber 1 with the balance of the system.

Figure 4D:
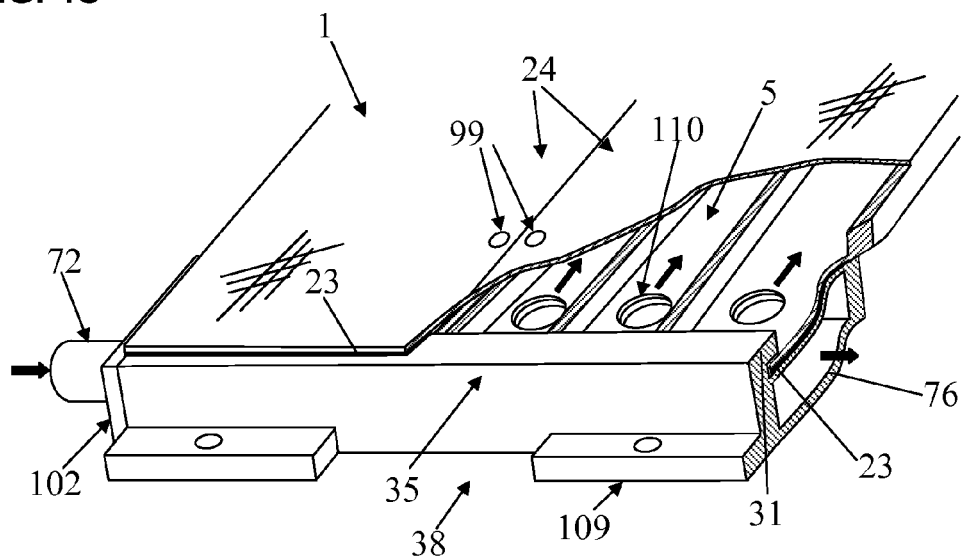
FIG. 4D shows a perspective cutaway view of the external manifold with integrated blocking members according to an embodiment.
Figure 4E:
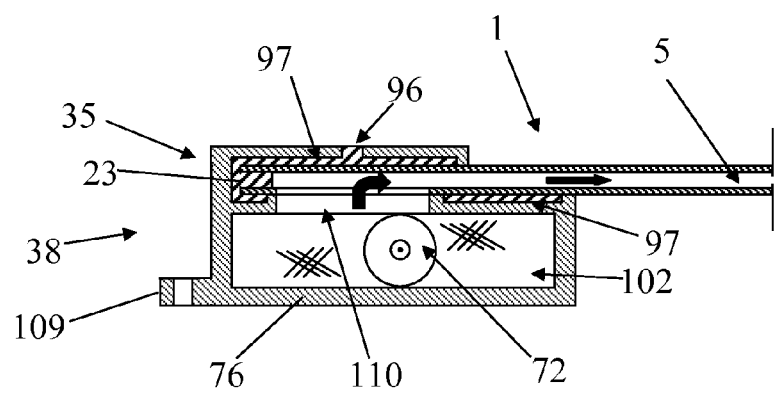
FIG. 4E shows a cross-section of the external manifold with integrated U-shaped element encompassing the micro-channel end openings according to an embodiment.

FIGS. 4D-4E show embodiments of external manifolds 38 used with the micro-channel absorber 1 according to an embodiment. The external manifolds 38 are preferably, although not only, used in thick structure panels (explained later), and are also utilized as structural reinforcing elements of the micro-channel panels. The preferred embodiments of the external manifolds 38 use rectangular tube as the body of the external manifold; however, use of round tubes is also contemplated.

FIG. 4D shows perspective cutaway view of an embodiment of an external manifold 38 (working in parallel flow configuration). The body of the external manifold 38 includes a rectangular tube 76 closed at its ends by end walls 102. The tube 76 is combined with the blocking member 31 that seals the micro-channel end openings 35 and provides an additional mechanical bond to the connection between the external manifold 38 and the micro-channel absorber 1 (shown as assembled from modular micro-channel sections 24). There is at least one fluid port 72 being in communication with the balance of the system, functioning as a fluid inlet (or fluid outlet) for the external manifold 38, where the fluid port 72 is embodied as a tubular connector preferably integrated with the end wall 102 or the wall of the tube 76. The interior of the fluid port 72 and the interior of the external manifold 38 are in communication with each other. In an embodiment, the connector for the fluid port 72 is integrated with the body of the external manifold 38 by any practical means (as discussed in FIG. 4A), at any direction and at any angle, including penetrating through the body of the micro-channel absorber 1 (as described in FIG. 6C). Before the external manifold 38 is attached to the micro-channel absorber 1, openings 110 are prepared in the wall of the tube 76 that is to be attached to the body of the micro-channel absorber 1 and the openings 110 are aligned to match openings prepared in the body of the micro-channel absorber 1 to provide communication between the interior of the body of the external manifold 38 and the interior of the fluid transport channels 5 of the micro-channel absorber 1. The blocking members 31 are installed in the micro-channel end openings 35 to seal the ends of the fluid transport channels 5 and the external manifold 38 is attached to the micro-channel absorber 1, preferably by an adhesive 23. The external manifold 38 may be additionally secured to the body of the micro-channel absorber 1 by welding or by fasteners, such as rivets 99, screws, bolts, or other practical means. The fasteners are contemplated to be placed in mounting holes of pierce-able areas as described previously. However, the external manifold 38 is alternatively attached only by use of mechanical means where gaskets seal the connection between the body of the micro-channel absorber 1 and the body of the external manifold 38. The entire external manifold 38, including the blocking members 31 and mounting elements 109 (optional), is preferably cast as one structure using metal, metal alloy, plastic, or plastic composite. It is also contemplated that the entire external manifold 38 is formed by direct casting of the external manifold's 38 structure over the micro-channel end openings 35 of the micro-channel absorber 1 (cast over method) using metal, metal alloy, plastic, or plastic composite.

In the simplest embodiment, the external manifold 38 is constituted by the rectangular tube 76 closed at its ends by end walls 102 and having openings 110 prepared in both the tube 76 and the body of the micro-channel absorber 1 (as described in the previous paragraph), and at least one fluid port 72. The external manifold 38 is attached to the body of the micro-channel absorber 1 by adhesive, mechanical means (with use of a gasket) or a combination of both. Blocking members 31, separate form the body of the external manifold 38, are installed in the micro-channel end openings 35 to seal the ends of the fluid transport channels 5.

FIG. 4E shows cross-section view of another embodiment of the external manifold 38 where the body of the external manifold 38 is configured to encompass the micro-channel end openings 35. In this embodiment, after the micro-channel end openings 35 are positioned in the external manifold 38, adhesive 23 is preferably injected through the apertures 96 to the adhesive cavities 97 thereby hermetically sealing the external manifold 38 to the body of the micro-channel absorber 1. However, use of combination of a gasket and mechanical means to secure and seal the external manifold 38 to the body of the micro-channel absorber 1 is also contemplated to obtain the hermetic seal. Preferably, the entire external manifold 38 is cast as one structure using metal, metal alloy, plastic, or plastic composite. It is also contemplated that the whole external manifold 38 that encompasses the micro-channel end openings 35 is formed by direct casting of the external manifold 38 structure over the micro-channel end openings 35 of the micro-channel absorber 1 (cast over method) using metal, metal alloy, plastic, or plastic composite.

Figure 5A:
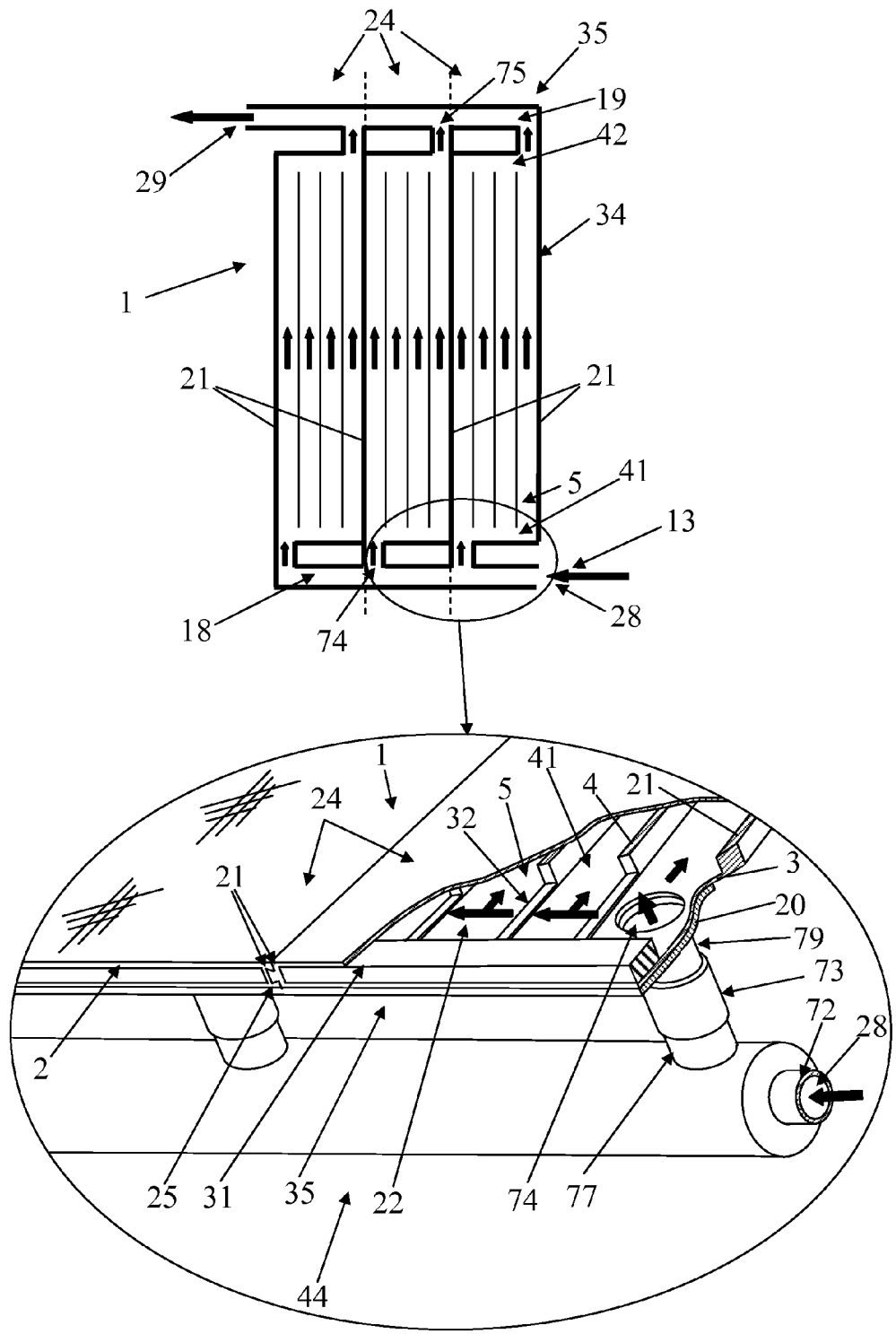
FIG. 5A shows schematics and perspective cutaway view of the micro-channel absorber in the distributed parallel flow configuration using remote manifolds in concert with internal manifolds according to an embodiment.
Figure 5B:
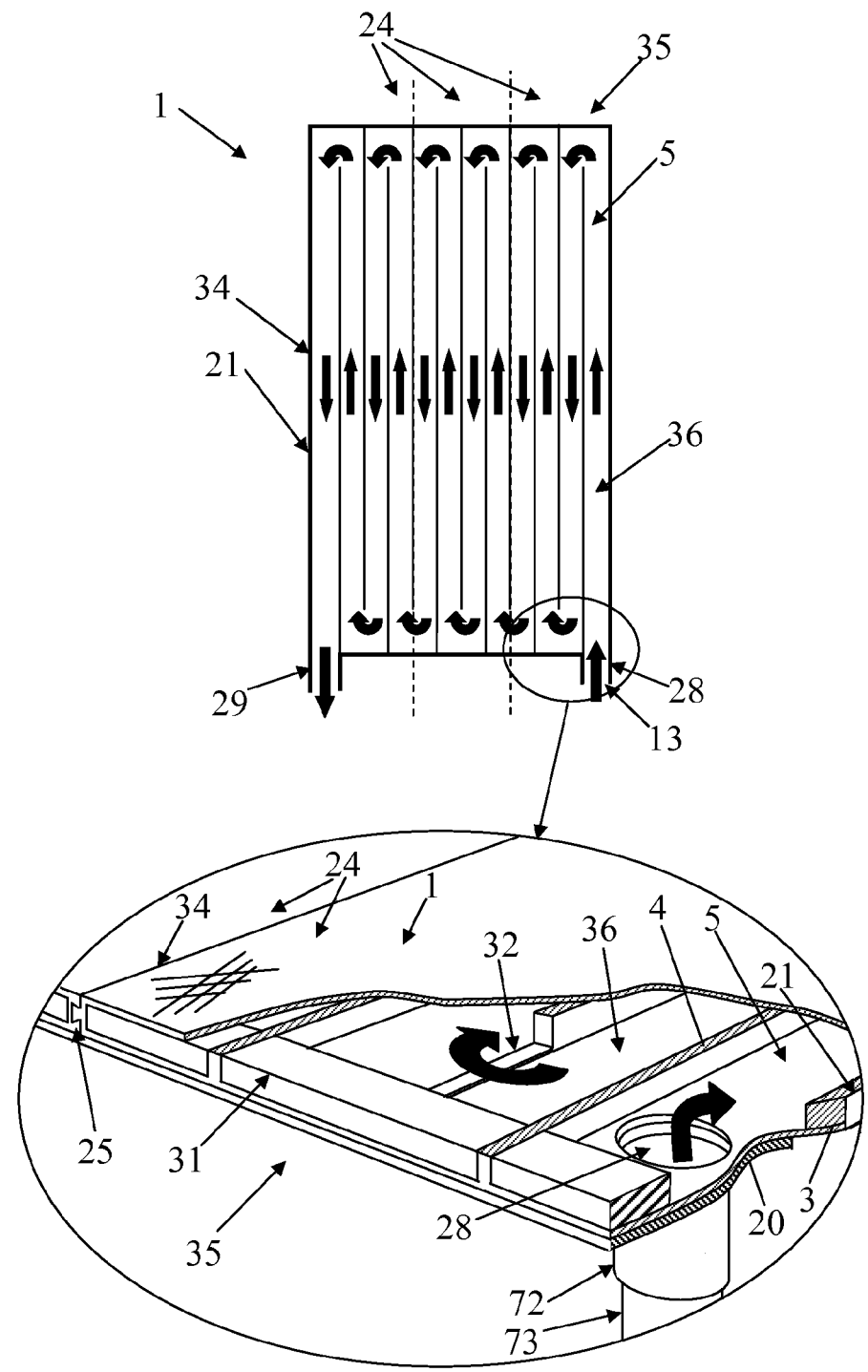
FIG. 5B shows schematics and perspective cutaway view of the micro-channel absorber with the serpentine flow configuration according to an embodiment.
Figure 5C:
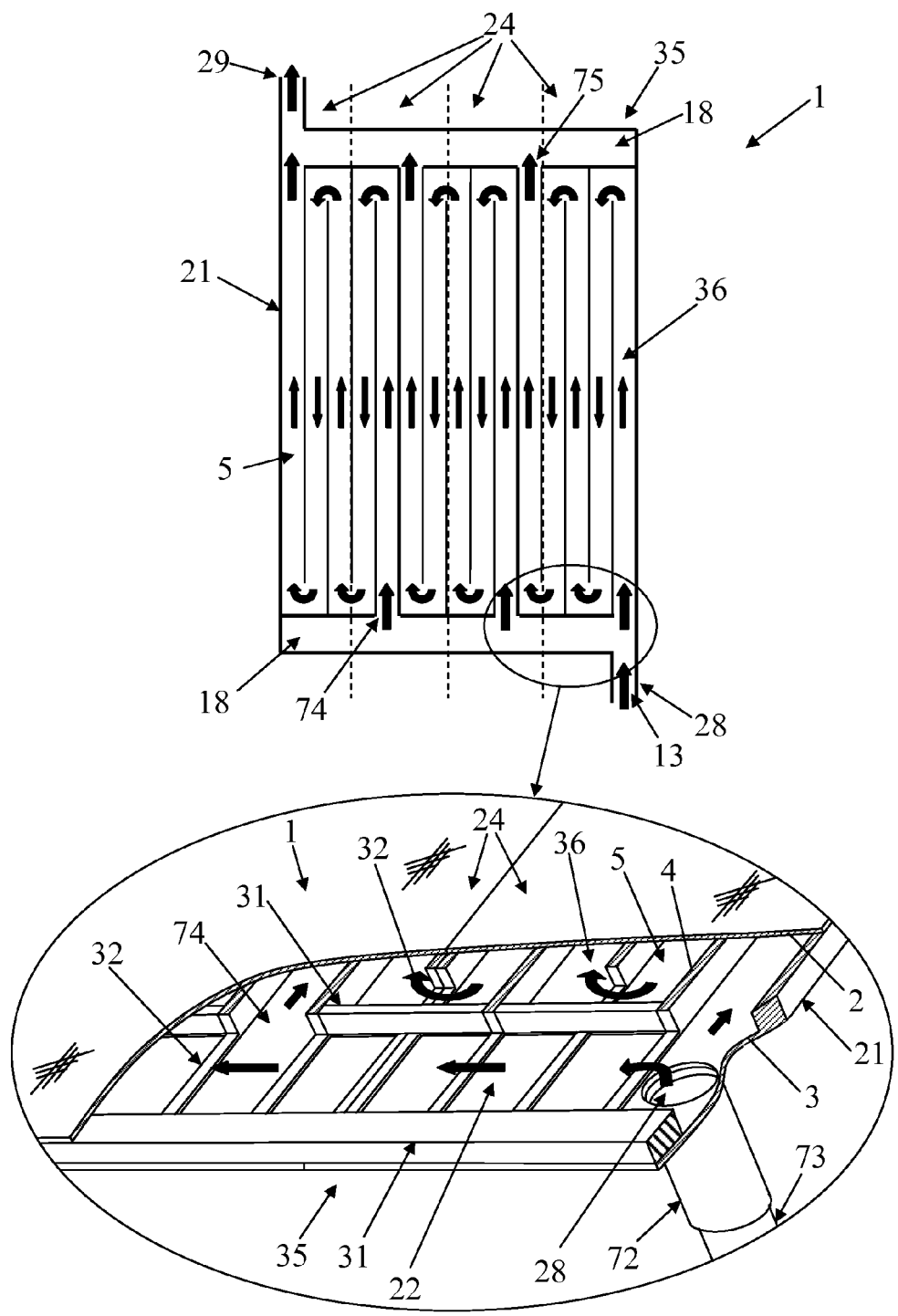
FIG. 5C shows schematics and perspective cutaway view of the micro-channel absorber with the parallel serpentines flow configuration using internal manifolds in accord with serpentine channels according to an embodiment.

FIGS. 5A, 5B and 5C show examples of different arrangements of the flow of the heat-transfer fluid 13 within the micro-channel panels. Simple flow patterns like parallel flow configuration using internal manifolds, remote manifolds, or external manifolds as well as all combinations of parallel and serpentine configurations using these types of manifolds are considered as the part of one or more embodiments but are not depicted. The dotted lines in the schematics symbolize possible boundaries of the modular micro-channel sections 24 assembled into one micro-channel absorber 1; however, the micro-channel absorber 1 can also include only one modular micro-channel section 24. The interlocking fasteners 25 (or their parts located close to the micro-channel end openings 35) are preferably covered with adhesive to seal the interlocking fasteners 25 and to assemble the modular micro-channel sections 24 into one micro-channel absorber 1.

In embodiments depicted in FIG. 5A, sealing of the interlocking fasteners 25 is not required because the heat-transfer fluid 13 is contained within the boundaries of each of the interlocked modular micro-channel sections 24. It is contemplated that the channel connectors 79 and fluid ports 72 depicted as installed to the back plate 3 can be installed to the active plate 2 or alternately to the active plate 2 and the back plate 3. It is also contemplated that the channel connectors 79 and fluid ports 72 may be oriented perpendicularly (as shown here) or at any angle to the plane of the micro-channel absorber 1, including parallel to the back plate 3 (integrated directly into the micro-channel end opening 35). Inserts in the drawings depict only one end of the panel; it is contemplated that each end of any panel may have different types of manifolds.

FIG. 5A shows schematics of the micro-channel absorber 1 with the distributed parallel flow configuration. In this configuration, the heat-transfer fluid 13 flows from the balance of the system, enters the distribution manifold 18 through the fluid inlet 28 (depicted in the insert as fluid port 72), is distributed separately to each modular micro-channel section 24 through the secondary fluid inlets 74, enters the secondary distribution manifold 41, flows in all parallel fluid transport channels 5 in the same direction between the secondary distribution manifold 41 and the secondary collection manifold 42, enters the secondary collection manifold 42, flows through the secondary fluid outlet 75 to the collection manifold 19 that collects the heat-transfer fluid 13 from each modular micro-channel section 24, and leaves the collection manifold 19 through the fluid outlet 29 (depicted in the insert as fluid port 72) to flow to the balance of the system.

FIG. 5A, in the insert, shows details of the embodiment using the remote manifolds 44 as distribution and collection manifolds 18 and 19 in concert with the internal manifolds 22 used as secondary distribution and secondary collection manifolds 41 and 42. Each of the interlocked modular micro-channel sections 24 has separate internal manifolds 22. The terminal micro-channel walls 21 of each of the modular micro-channel sections 24 are left intact without removing any portion of their walls. The blocking members 31, which hermetically seal the whole micro-channel end opening 35 in each modular micro-channel sections 24, are installed on both ends of the micro-channel absorber 1. Channel connectors 79 are used for each of the modular micro-channel sections 24 to provide fluid secondary inlet 74 and fluid secondary outlet 75 to the internal manifolds 22. The channel connectors 79 are attached to the back plate 3 of the micro-channel absorber 1. Each secondary fluid inlet 74 and corresponding secondary fluid outlet 75 in the modular micro-channel sections 24 is located on the diagonally opposite sides of the modular micro-channel section 24 to balance an equal flow of the heat-transfer fluid 13 through all of the fluid transport channels 5 within the section. Remote manifolds 44 (for distribution and collection) are connected to both ends of the micro-channel absorber 1. It is contemplated that external manifolds are used instead of the remote manifolds 44.

FIG. 5B shows schematics of the micro-channel absorber 1 with the serpentine flow configuration. In this configuration, there is no need for distribution and collection manifolds. FIG. 5B in the insert shows details of the embodiment using the inter-channel openings 32 as linking passages between the adjacent fluid transport channels 5. The serpentine channel 36 is created by: (a) removing a part of every other micro-channel wall 4, counting from one of the terminal micro-channel walls 21 of the micro-channel absorber 1 (the terminal micro-channel walls 21 are left intact) to create the inter-channel openings 32 of required width, (b) repeating step (a) by removing every other micro-channel wall 4 alternate to those removed on the opposite end of the micro-channel absorber 1, (c) by sealing the micro-channel end openings 35 using blocking members 31 (or other means), and (d) by integrating fluid ports 72 to provide the fluid inlet 28 and the fluid outlet 29 to the serpentine channel 36. The fluid port 72 is attached directly to the back plate 3 of the micro-channel absorber 1 by any practical means, or it is first attached to a manifold plate 20 (as depicted here). The connecting pipes 73 are attached to the fluid port 72 to link the micro-channel absorber 1 with the balance of the system.

FIG. 5C shows schematic and perspective cutaway views of the micro-channel absorber 1 with multiple serpentine channels arranged in parallel configuration, where internal manifolds 22 (distribution manifold 18 and collection manifold 19) together with a plurality of serpentine channels 36 in communication with the internal manifolds 22 are created within the body of the panel by altering the channel walls 4.

The micro-channel walls 4 are arranged to facilitate the flow through the multiple serpentine channels arranged in parallel configuration by: (a) removing at least a portion of every wall 4 proximal to the micro-channel end openings 35 to the depth equal to the required width of the internal manifold 22 on both ends of the panel, except the terminal walls 21, to form the first set of inter-channel openings 32, the depth of which defines internal border lines of the first set of the inter-channel openings 32; (b) dividing all fluid transport channels 5 in the micro-channel absorber 1 into groups, each group containing an odd number of channels 5; (c) starting on one end of the micro-channel absorber 1 from the first wall after the terminal wall 21, further removing at least a portion of every other micro-channel wall 4 to the depth required to create the second set of inter-channel openings 32 to create the serpentine channels 36 of the required width measured from the internal border line for all channels in the group and repeating for each further group starting from the second wall in each group; (d) repeating step (c) on the other end of the panel; (e) using blocking members 31 to hermetically seal the openings created at the internal border lines between the first and the second set of openings on both ends of the panel, leaving open the micro-channels that are designated as secondary fluid inlets 74 and corresponding secondary fluid outlets 75 for entries and exits of the serpentine channels 36; (f) using blocking members 31 to hermetically seal the micro-channel end openings 35 at both ends of the panel; and (g) integrating at least one fluid port 72 at each end of the micro-channel absorber 1, where the fluid port 72 is in communication with internal manifold to function as the fluid inlet 28 (at one end of the micro-channel absorber 1) and the fluid outlet 29 (at the other end of the micro-channel absorber 1) to the internal manifolds 22. The connecting pipes 73 are attached to the fluid ports 72 to link the micro-channel absorber 1 with the balance of the system.

FIGS. 6A-6E depict different embodiments of panels implementing the micro-channel absorber 1. The micro-channel absorber 1 constitutes a strong and rigid structure that can be easily attached to existing surfaces or combined with other materials to create composite (sandwich) structures that may be used as building structural elements. When mounted in close proximity to each other, the micro-channel panels constitute large area cladding, where the cladding covers entire walls and roofs of a building, and the cladding is used for solar thermal and thermal applications, according to an embodiment. The micro-channel panels are divided into groups of thin and thick panels based on their structure. Thin and thick panels are contemplated to be used for covering entire roofs and walls of a building, although for simplicity of explanations all of the embodiments in FIGS. 6A-6E are depicted in the form of individual thin and thick panels. However, the depiction should not limit the scope of this patent to individual panels as used in contemporary installations.

Both groups of panels, thin and thick, are further divided into configurations based on the surface covering secured over the active surface 6: (a) bare configuration, where the active surface 6 of the micro-channel absorber 1 is with or without optically selective coating 11, (b) covered configuration, where the micro-channel absorber 1 has a layer of covering material 40 secured over the active surface 6, and (c) glazed configuration, where the micro-channel absorber 1 is combined with a layer, or layers, of glazing 106, separated from the active surface 6 by an air gap 105.

The thin panels 87 comprise of the micro-channel absorber 1 in bare, covered, or glazed configuration, and are contemplated to double as finish surfaces attached to rigid substrates or integrated within frames of walls, roofs, as well as installed on any rigid architectural elements as large doors (for example, garage doors or bay doors), shading devices, window shutters, and fences. They can also be incorporated into window frames and curtain wall structures the same way as window glass vision panels are installed. The thick panels 90 comprise of the thin panels 87 in bare, covered, or glazed configuration that are integrated with reinforcement core layer 92 (such as a honeycomb structure or a layer of rigid structural foam) and with a back sheet 93 of material to form one sandwich structure providing structural strength capable of withstanding considerable loads and providing additional thermal and acoustic insulation. The thick panels 90 are contemplated to be used as structural elements of walls and roofs, as well as any rigid architectural elements, such as large doors (for example garage doors or bay doors), shading devices, window shutters, and fences. However, they can also be attached directly to rigid substrates, frames, and incorporated into curtain wall structures and in window framings (the same way as window glass vision panels or spandrel panels are installed). The thin panels 87 and thick panels 90 in bare, covered, and glazed configurations may be used as solar thermal collectors, heat collectors and heat dissipaters.

FIGS. 6A-6C show perspective cutaway and cross-section views of embodiments incorporating the micro-channel absorbers 1 in the thin panels 87. Due to their small thickness and easy methods of fastening to existing substrates, thin panels 87 are especially suitable for retrofit installations. Thin panels 87 can be attached to the substrate or frame by: (a) use of adhesives, such as epoxy or structural silicone adhesives, (b) fastening using fasteners (as screws, bolts, or nails) penetrating through the pierce-able areas, (c) use of fasteners or fastening elements that do not penetrate the body of the micro-channel absorber (as pressure plate method). It is contemplated that combination of these methods can be used, as well as any other method used for attaching cladding elements or installing window glass vision panels. Also, it is contemplated that a layer of insulation may be adhered to the back surface of the micro-channel absorber 1 as an integral part of the thin panel.

FIGS. 6A and 6B depict one fluid port 72 in communication with connecting pipe 73, where the fluid port 72 is integrated into the body of the micro-channel absorber 1. This is done for purpose of illustration and example, and is not to be taken by way of limitation. Different manifolds and combinations of connectors facilitating different flow patterns can be used for the thin panels 87. It is contemplated that to take full advantage of the thin structure, internal manifolds, remote manifolds, and serpentine flow configurations, or combinations of these, are used in accord with the thin panels 87; however, external manifolds can also be used (as explained later).

The thin panel 87 in FIG. 6A is depicted as built in the covered configuration. The thin panel 87 in the covered configuration is constituted by securing a layer of covering material 40 over the active surface 6 of the micro-channel absorber 1. It is contemplated that the layer of the covering material 40 is as thin as possible (to lower the heat capacity and the heat resistance caused by the material) and that materials with a low heat transfer coefficient should preferably be avoided for this layer or the materials should be modified to increase their heat transfer coefficient.

The layer of covering material 40 functions as an absorption layer converting solar radiation to heat, accumulating energy, and releasing energy to the micro-channel absorber 1. The layer of the covering material 40 can be secured over the active surface 6 by different methods: (a) adhering sheets of the covering material 40 by use of adhesive 23 (as depicted), (b) applying the covering material 40 directly to the active surface 6 using the material's ability to permanently bond to the active surface (the covering material is preferably applied to the active surface 6 after the micro-channel absorber 1 is mounted to the building's structure or may be applied before the installation), (c) attaching the covering material 40 together with the body of the micro-channel absorber 1 to the substrate or framing by use of fasteners, such as nails or screws, going through the layer of the covering material 40 and through the body of the micro-channel absorber 1, and (d) attaching the covering material 40 together with the body of the micro-channel absorber 1 to the substrate or framing by use of fastening elements, such as pressure plate, not penetrating through the body of the micro-channel absorber 1 and through the layer of the covering material 40 (however, it is contemplated that the covering material 40 has margins extending beyond the boundaries of the micro-channel absorber 1, and fasteners penetrate through the covering material 40 at the margins but do not penetrate through the body of the micro-channel absorber 1). Different materials may be used as the covering material 40 depending on the contemplated use and place of mounting of the thin panel 87.

For the "adhering" method the following materials are preferably contemplated: (a) veneer of natural or man made stone, (b) ceramics, (c) metal or metal alloy sheets, (d) plastic or plastic composite sheets, (e) plaster, cement, or gypsum (drywall) boards, (f) glass (adhered directly to the micro-channel absorber 1 without an air gap). It is also contemplated that entire photovoltaic solar panels or photovoltaic solar cells are adhered directly to the active surface 6 of the micro-channel absorber 1 as covering material 40. Preferably, epoxy adhesive is used for securing the sheets of covering material 40 to the active surface 6; however, other adhesives are also contemplated. For the "application" method the following materials are preferably contemplated: (a) plaster (made of gypsum, lime, or cement) or synthetic stucco, (b) roof covering materials that are laid on bitumen or poured, such as liquid rubber, mineral felt, (c) poured covering materials, such as concrete or terrazzo, (d) asphalt. For the both "fastener" methods the following materials are preferably contemplated: (a) natural or manmade stone slabs, (b) all types of boards (such as drywall or cement boards), (c) roofing materials that are nailed to the roof substrate, such as asphalt shingles, roofing tiles, or metal sheets. It is also contemplated that entire photovoltaic solar panels are fastened (by use of fasteners) over the micro-channel absorber 1 as covering material 40. The covering materials are not limited to the examples described above, but rather are listed for illustration purposes and not for limiting. It should be noted that other materials used for wall or roof coverings and different methods of fastening are also contemplated.

The thin panel 87 depicted in FIG. 6A, when embodied without the layer of the covering material 40, constitutes the thin panel 87 in the bare configuration (not depicted). In the case of the thin panel 87 in the bare configuration functioning as the solar thermal collector, the micro-channel absorber 1 has a layer of optically selective coating applied to its active surface (not depicted). Also, surface grooves and surface fins can be formed as the part of the active surface 6 to increase efficiency. However, the active surface 6 can be left without the optically selective coating, only anodized (if metal or metal alloys are used), coil coated, or painted, and also may not have the surface grooves and surface fins formed as a part of the active surface 6. The thin panel 87 in the bare configuration also functions as a heat collector and a heat dissipater when it is built with or without the optically selective coating.

The thin panel 87 in FIG. 6B is depicted as built in the glazed configuration. The embodiment of the thin panel 87 in the glazed configuration is comprised of the micro-channel absorber 1, glazing 106, spacer 103, and airtight seal 104. In this embodiment, the active surface 6 of the micro-channel absorber 1 is covered by a layer of optically selective coating 11 to increase the efficiency of absorption of solar energy. Also, surface grooves and surface fins may be extruded as the part of the active surface 6 to further increase efficiency. The thin panel 87 in the glazed configuration is assembled the same way as a contemporary double glazed glass vision panel, where the thin panel 87 is used in place of the second sheet of glass. The glazing 106 is preferably made of solar glass or translucent plastic as used in contemporary glazed solar collectors.

It is also contemplated that the glazing 106 may be made of two glazing sheets separated by a spacer to create an air gap between them (as in triple glazed glass vision panels, where the terminal sheet of glass is replaced by the thin panel 87). The spacer 103 is placed around the perimeter of the thin panel 87 between the micro-channel absorber 1 and the glazing 106. The spacer 103 defines the air gap 105 between the glazing and the micro-channel absorber 1. The thickness of the air gap 105 is considered to be in the range between and including 4.0 mm and 50.0 mm, but preferably between 9.0 mm and 25.0 mm; however, different thicknesses are also contemplated. Further, it is contemplated that the spacer 103 has a hollow shape and has openings 108 to allow air or gas contained in the air gap 105 to freely penetrate the inner space of the hollow spacer 103. A desiccant 107 (such as silica based desiccant) is placed in the hollow inner space of the spacer 103 to prevent water condensation in the air gap 105. An airtight seal 104 preferably made of silicone or polyurethane is applied around the perimeter of the thin panel 87 to seal and bond together the entire structure. It is contemplated that there are two sealed apertures 96 pre-drilled through the body of the thin panel 87 providing access directly to the bed of desiccant 107 or to the air gap 105 to provide means of regeneration of the desiccant 107 (for example by the use of dry hot air). It is also contemplated that the thin panel 87 is built without using desiccant 107 (using a spacer 103 that is commonly used for contemporary glass vision panels). Because the thin panel 87 can be made with the same thickness as a double glazed (or triple glazed) glass vision panel and weighs nearly the same as a double or triple glazed glass vision panel, it can be retrofitted in window frames or in curtain walls without any changes to the framing. When this embodiment is used for curtain walls, the body of the micro-channel absorber 1 may be made of glass or translucent plastic to allow light to access the internal space of the building.

The thin panel 87 in FIG. 6C is depicted as the thin panel 87 in the glazed configuration. The embodiment of the glazed thin panel 87 is comprised of the micro-channel absorber 1 (with the active surface configured as described in FIG. 6 B), glazing 106, spacer 103, airtight seal 104, and two external manifolds 38 (the distribution and the collection manifolds), each external manifold 38 having a thickness equal to the thickness of the spacer 103. The external manifolds 38 are coupled with the active surface 6 of the micro-channel absorber 1 and are located between the glazing 106 and the micro-channel absorber 1. In the cross-section of the thin panel 87, there is shown the spacer 103 containing desiccant 107, depicted as adjacent to the external manifold 38. However, it is contemplated that there are no spacers 103 on the two ends of the thin panel 87, where the external manifolds 38 are located, and the external manifolds 38 function as the spacer at these ends.

In the case when external manifolds 38 are used as the spacer, the desiccant 107 is contained only in the spacers 103 that are located at the edges between the external manifolds 38. The entire perimeter of the thin panel 87 is sealed and bonded together by the airtight seal 104 (as described in the previous paragraph). It is also contemplated that the spacer 103 containing the desiccant 107 is placed at the entire perimeter of the thin panel 87 (as in the thin panel in FIG. 6B) and the external manifolds 38 are thinner than the spacer 103. In this case the external manifolds 38 are attached to the active surface 6 of the micro-channel absorber 1 and are not in contact with glazing 106, allowing for the gas or air contained in the air gap 105 to reach the desiccant 107 contained in the spacer 103. It is contemplated that in this embodiment, the thickness of the air gap 105 is preferably between 12 mm and 42 mm; however, different thickness is also contemplated. It is furthermore contemplated that double glazing is used. Also, the use of the sealed apertures to provide means of regeneration of the desiccant is contemplated as described previously. It is also contemplated that the thin structure solar collector is built without using desiccant 107. The fluid ports 72 in the form of connectors for the fluid inlet (and outlet) are integrated with the wall of the external manifold 38 being attached to the active surface 6. The fluid ports 72 extend through the body of the micro-channel absorber 1 and are attached outside of the thin panel 87 to the connecting pipes 73 that are in communication with the balance of the system.

To facilitate the passage of the fluid ports 72 through the body of the micro-channel absorber 1, an opening is formed through the area of one or more of the adjacent fluid transport channels 5 sealed in the area of penetration by a blocking member 31. It is also contemplated that the fluid ports 72 for the fluid inlet (and outlet) are attached to the end walls 102 of the external manifolds 38 and extend through the airtight seal 104 to be connected outside of the thin panel 87 to connecting pipes 73.

Figure 6E:
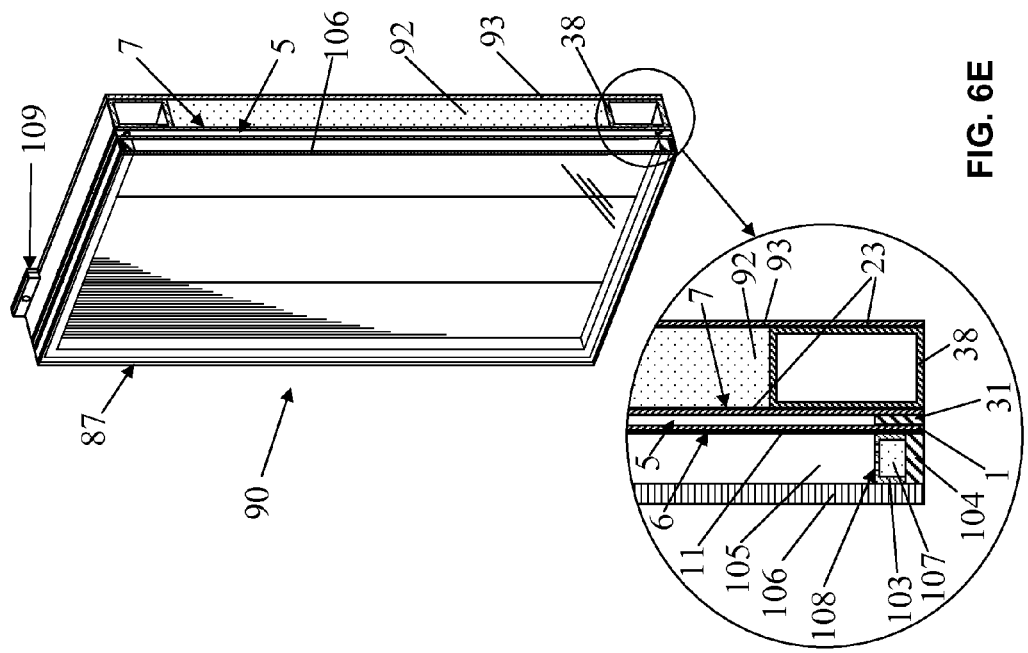
FIGS. 6D-6E show perspective cutaway views and cross-section views of embodiments incorporating the micro-channel absorber in the thick panel structure with different covering material configurations according to an embodiment.
Figure 6D:
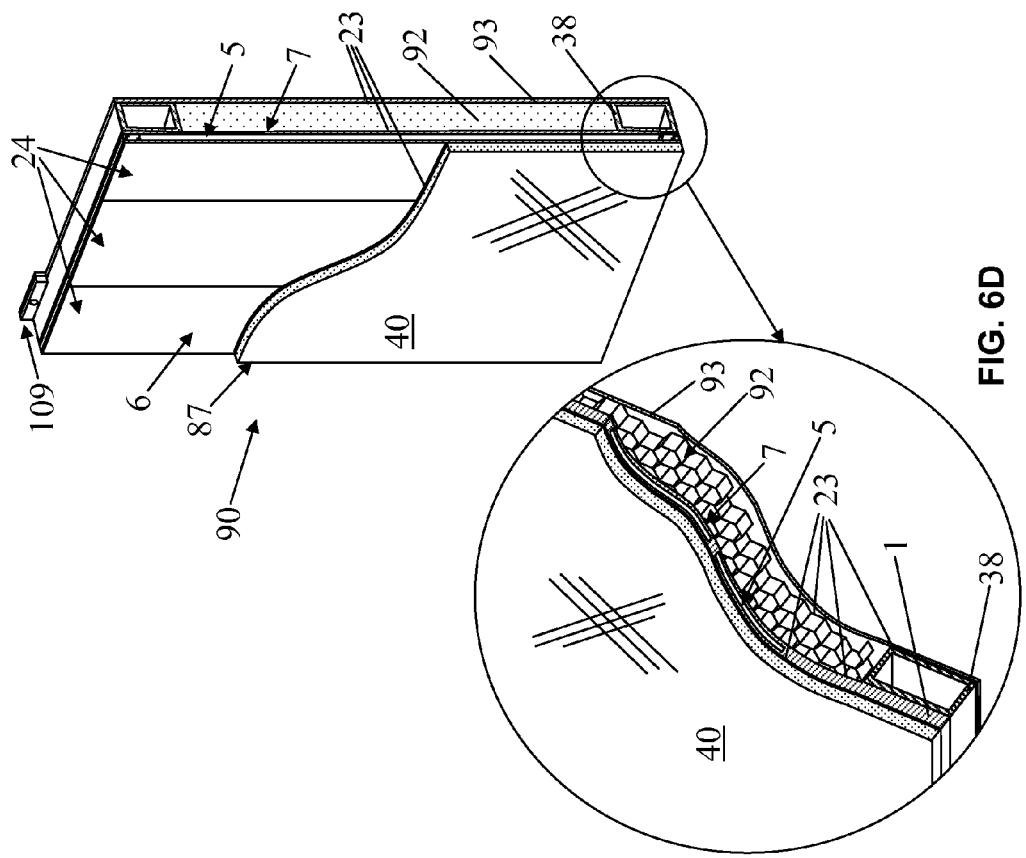

FIGS. 6D and 6E show perspective cutaway and cross-section views of embodiments incorporating the micro-channel absorber 1 as the thick panels 90. The thick panels 90 can be attached to the substrate or framing by use of: (a) concealed screw method (where mounting elements 109 attached to the thick panels 90 are extending into the joint between the thick panels 90, to be attached to the framing or substrate by fasteners later masked by sealant at the joint), (b) fasteners not going through the body of the micro-channel absorber 1 as pressure plate method in the case of curtain walls, (c) fasteners going through the body of the micro-channel absorber 1, (d) adhesives. It is contemplated that any combination of these methods can be used, as well as any other method used for attaching cladding elements. Thick panels 90 are especially suitable for retrofit installations of curtain walls, and external walls insulation systems, due to their rigid structure, low weight and easy methods of fastening to existing structures. The thickness of the thick panels is contemplated to be in the range between 10.0 mm and 150.0 mm, but preferably: (a) between 20.0 mm and 50.0 mm for thick panels 90 in bare or covered configurations, and (b) between 25.0 mm and 70.0 mm for thick panels 90 in glazed configurations; however, other thickness is contemplated.

The thick panel 90 in FIG. 6D is depicted in the covered configuration. The thick panel 90 depicted here includes the thin panel 87 in the covered configuration (described in detail in FIG. 6A), external manifolds 38, core layer 92, and back sheet 93. The external manifolds 38 provide an additional means of integrating the micro-channel sections 24, stiffen the entire structure of the thick panel 90, and provide a base for securing mounting elements 109. The core layer 92, which stiffens the structure and provides additional layer of thermal and acoustic insulation, includes a honeycomb structure made of metal or plastic attached by adhesive 23 to: (a) the back surface 7 of the micro-channel absorber 1, (b) bodies of the external manifolds 38, and (c) the back sheet 93 made of metal or plastic that closes the structure (being glued to the external manifolds 38 and to the core layer 92). It is contemplated that the core layer 92 can be made of rigid foam material made of plastic, metal, or glass. The thin panel 87, the core layer 92, the back sheet 93, and the external manifolds 38 constitute a very light and rigid sandwich structure.

However, additional stiffening elements preferably in the form of flat bars, angle bars, or tubes incorporated into the core layer 92 are also contemplated. There is no need for attaching manifolds to the micro-channel absorber 1 when the serpentine configuration of the fluid transport channels 5, or internal manifolds or remote manifolds, are used. In this case, the thick panel 90 is assembled only of the thin panel 87, core layer 92, and back sheet 93; however, it is contemplated that the thick panel 90 in this configuration may also have additional stiffening elements (as mentioned above) incorporated into the core layer 92. The thick panel 90 in FIG. 6D, can be embodied using the thin panel 87 in the bare configuration (not depicted; as described in FIG. 6A) instead of the thin panel 87 in the covered configuration.

The thick panel 90 in FIG. 6E is depicted in the glazed configuration. The thick panel 90 depicted here includes the thin panel 87 in the glazed configuration (described in detail in FIG. 6B), external manifolds 38, core layer 92, and back sheet 93. All of these elements are assembled into the thick panel 90 as described in FIG. 6D. Also, it is contemplated that the thick panel 90 includes the thin panel 87 in the glazed configuration, core layer 92, and back sheet 93 as described in FIG. 6D. For an embodiment of the glazed thick panel 90, double glazing is also contemplated. Furthermore, sealed apertures to provide means of regeneration of the desiccant are contemplated as described previously.

Figure 7B:
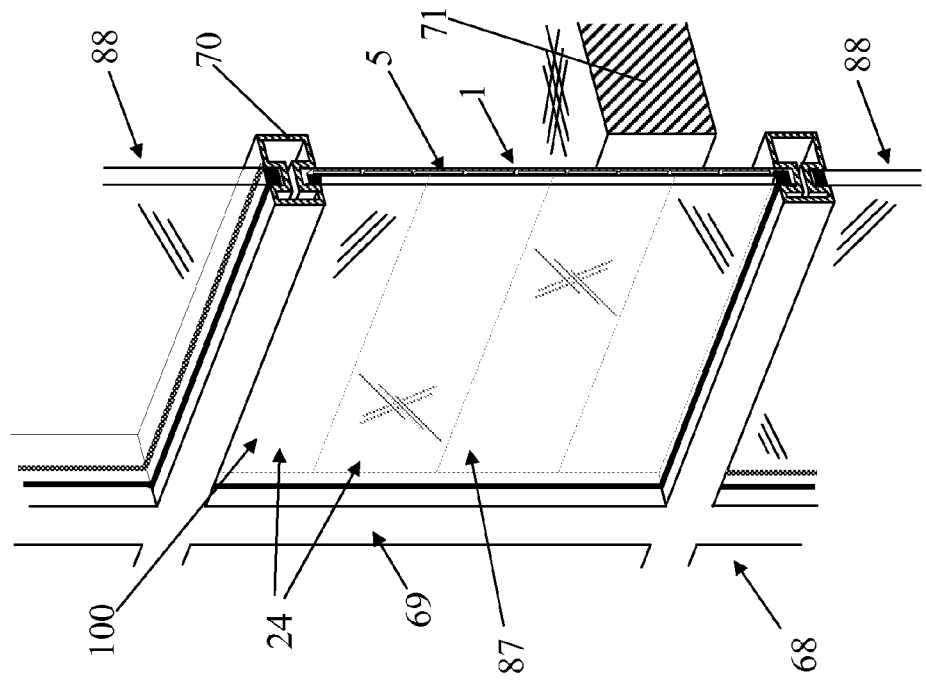
FIG. 7B shows a perspective cross-section view of the thin panel in the glazed configuration incorporated into the spandrel frame of a curtain wall.
Figure 7A:
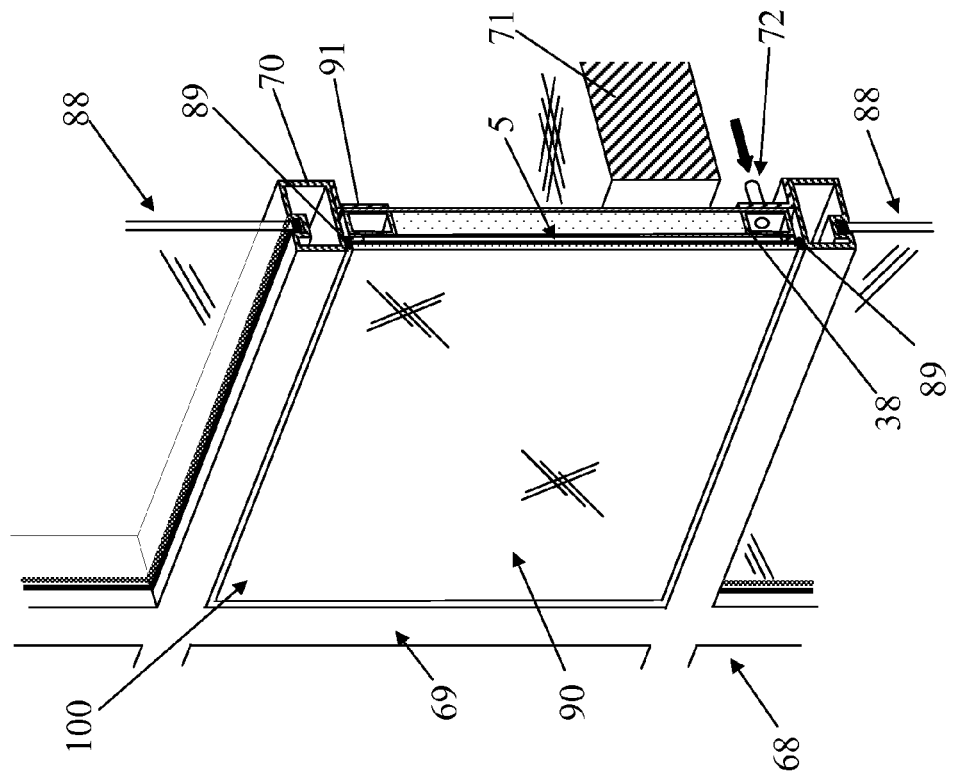
FIG. 7A shows a perspective cross-section view of the thick panel in the covered configuration incorporated into the spandrel frame of a curtain wall.

FIGS. 7A and 7B show embodiment of the cladding systems for curtain walls using thin and thick panels 87 and 90 as solar thermal collectors, heat collectors, and heat dissipaters according to one or more embodiments. Contemporary curtain walls comprise of glass vision panels and spandrel panels mounted in a prefabricated aluminum frame. Curtain walls incorporate glass, metal, or stone facing panels in the spandrel frames. The thin panels 87 in all three configurations (bare, covered and glazed) have similar structural strength, weight, and thickness as glass vision panels (double or triple glazed) broadly used in facades and curtain walls. Also, the thick panels 90 in all three configurations (bare, covered and glazed) have similar structural strength, weight, and thickness as glass vision panels and contemporary honeycomb stone composite panels broadly used in facades and curtain walls. Thin and thick panels 87 and 90 can be fabricated to the required thickness and dimensions to fit into existing systems of major curtain wall manufacturers and can be retrofitted in facades and curtain walls without any changes to the existing framing or substrates.

FIG. 7A shows a perspective cross-section view of the thick panel 90 in the covered configuration incorporated into the spandrel 100 frame of a curtain wall 68. However, it is contemplated that the thick panel 90 can be in the bare or the glazed configuration having one or two layers of glazing. Curtain wall framing has mullions 69 and transoms 70, and is attached to the concrete slabs 71 of the building structure. The depicted curtain wall 68 has glass vision panels 88 and spandrel panels 100 (replaced here by thick panels 90). However, the thick panels 90 may be installed in the entire segment of the curtain wall 68 replacing both spandrels and glass vision panels 88. The fluid port 72 for fluid inlet (the fluid outlet is not shown) is depicted as being integrated into the back wall of the external manifold 38; however, the fluid port 72 can be attached to the end wall of the external manifold 38 and enter the internal space of the mullion 68 to be linked with the next thick panel or with connecting pipes that are hidden in the mullion and are in communication with the balance of the system. The thick panel 90 is depicted as being attached to the framing by anchoring elements 91; however, it can be attached by any other means used in the contemporary state of the art curtain wall systems (such as pressure plate systems or structural sealant systems).

In this embodiment, the joints between the thick panels 90 and framing and between the adjacent thick panels 90 are sealed by backer rods and sealant 89 (such as silicone or urethane). However, any other types of joints used in curtain walls embodiments are contemplated. The joints between the thick panels 90 serve an aesthetic and functional purpose by allowing for the movements of the panels and building structure. The thick panel 90 is depicted with a vertical configuration of the fluid transport channels 5; however, a horizontal configuration of the fluid transport channels 5 is also considered.

FIG. 7B shows a perspective cross-section view of the thin panel 87 in the glazed configuration (depicted here as having the micro-channel absorber 1 assembled from modular micro-channel sections 24) incorporated into the spandrel 100 frame of a curtain wall 68. However, it is contemplated that the thin panel 87 can be in the bare or the covered configuration, or can be in glazed configuration with double glazing. The thin panel 87 is attached to the framing in the same way as glass vision panels 88 by any means used in the contemporary state of the art curtain wall systems (such as pressure plate systems, rubber glazing gasket systems or structural sealant systems). It is also contemplated that if plastic or glass is used as material for the body of the micro-channel absorber 1, the thin panel 87 in the glazed or the bare configuration is partially translucent providing additional lightning to the internal space of the building. The thin panel 87 is depicted with a horizontal configuration of the fluid transport channels 5; however, a vertical configuration of the fluid transport channels 5 is also considered. Also, it is considered that thin panels 87 in bare configuration or thick panels 90 in bare configuration can be mounted as retrofits inside the building, behind the existing glass vision panels 88 (and may not be mounted directly to the structure of the curtain wall 68), to collect solar energy entering the building's interior.

Figure 8A:
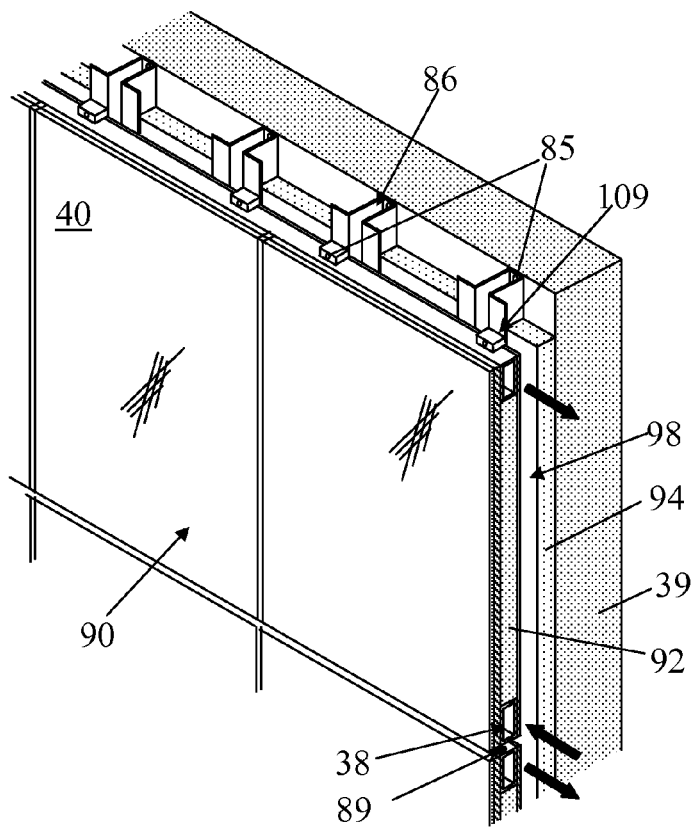
FIG. 8A shows a cutaway perspective view of an embodiment using the thick panels in the covered configuration as the cladding element of the solar collection and insulation system according to an embodiment.
Figure 8B:
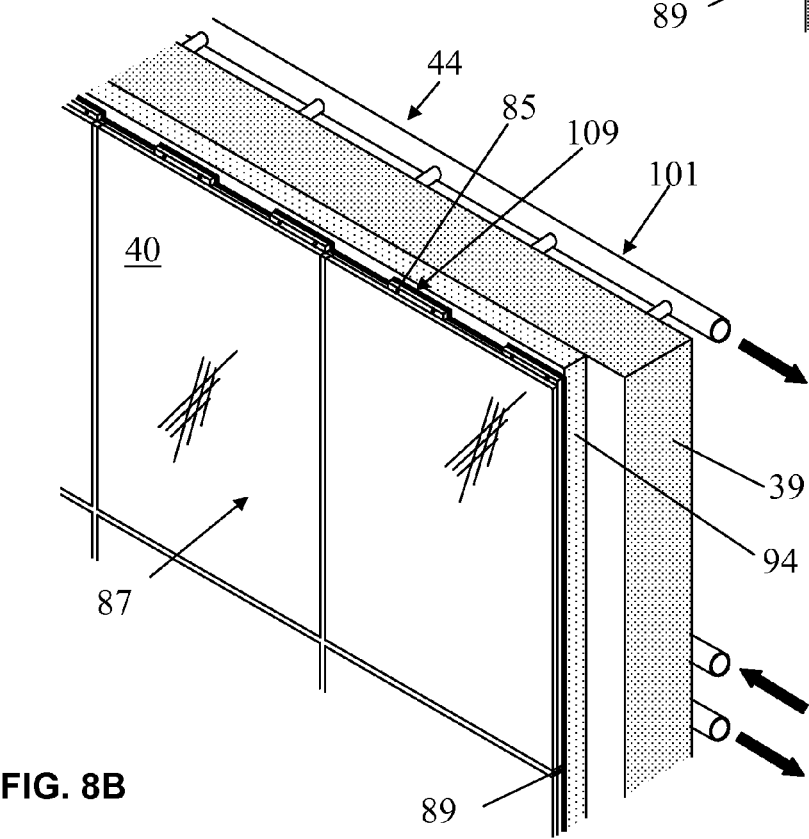
FIG. 8B shows a cutaway perspective view of an embodiment using the thin panels in the covered configuration as the cladding element of the solar collection and insulation system according to an embodiment.

FIGS. 8A and 8B show cutaway perspective views of embodiments of an solar collection and insulation system incorporating thin panels 87 or thick panels 90. Contemporary external wall insulation systems are installed mostly as retrofits to existing building envelopes to lower thermal losses through external walls. The disclosed solar collection and insulation system works as: (a) an exterior cladding system, (b) a large area solar thermal collector, (c) a heat collector, (d) an additional thermal and acoustic insulation of the external wall, (e) a heat dissipater. The thin panels 87 or thick panels 90 constitute cladding covering entire wall or only spandrel areas. The thin panels 87 or thick panels 90 in the covered configuration with covering materials 40 such as natural stone veneer or stucco are contemplated as preferred for the embodiments of the solar collection and insulation system. However, other covering materials and the use of the bare and the glazed (with single and double glazing) configurations of the thin panels 87 or thick panels 90 are also contemplated. In the embodiment using a natural stone veneer (made of any stone used in cladding such as marble, granite, or sandstone) the natural stone veneer is glued by adhesive (preferably an epoxy adhesive) to the active surface of the micro-channel absorber. The natural stone veneer is contemplated to have thickness in the range between and including 3.0 mm and 30.0 mm, but preferably between 3.0 mm and 5.0 mm.

When stucco or plaster is used as covering material 40, the micro-channel absorber preferably has the active surface extruded with anchors and has reinforcing mesh preferably glued or mechanically connected to the anchors and the thin panels 87 (or thick panels 90), without the covering material, are first attached to the substrate 39 or to the mounting profiles 86, and then the layers of covering material 40 are applied through the reinforcing mesh to the active surface.

FIG. 8A shows thick panels 90 in the covered configuration as the cladding elements of the wall solar collection and insulation system. Mounting profiles 86 (open or closed profiles made of metal or plastic) are attached by fasteners 85 to the existing wall substrate 39, and a continuous layer of insulation 94 (such as polystyrene foam, polyurethane foam, or mineral wool) is secured to the wall substrate 39 in-between the mounting profiles 86 by means of adhesives or fasteners (or both). Thick panels 90 are secured to the mounting profiles 86 by fasteners 85 going through mounting elements 109 and the thick panels 90 are installed leaving a ventilation gap 98 between the thick panels 90 and the layer of insulation 94. However, it is contemplated that the thick panels 90 may be installed without the ventilation gap 98. The use of thin panels 87 in the configurations, both with and without the ventilation gap 98, is also contemplated. It is contemplated that a layer of metalized plastic film made of material, such as Kynar® (not depicted), is secured to the surface of the layer of insulation 94 to deflect thermal radiation back to the thick panels 90. Joints between thick panels 90 are shown as sealed by a backer rod and sealant 89, but any solution used for sealing the joints between cladding elements is contemplated. The heat-transfer fluid is distributed by external manifolds 38.

FIG. 8B shows thin panels 87 in the covered configuration as the cladding elements of the wall solar collection and insulation system. In this embodiment, there is no thermal separation in the form of a ventilation gap between the thin panels 87 and the layer of insulation 94, and the thin panels 87 are thermally coupled to the layer of insulation 94. The continuous layer of insulation 94 is secured to the wall substrate 39 by means of adhesives or fasteners (or both). Thin panels 87 are secured to the wall substrate 39, through the layer of insulation 94, by fasteners 85. The fasteners 85 extend through mounting elements 109 that are constituted by pierce-able areas at the ends of micro-channel absorbers, or through other pierce-able areas or mounting holes (not depicted here). Joints between thin panels 87 are shown as sealed by sealant 89, but any solution used for sealing the joints between cladding elements is contemplated. The heat-transfer fluid is distributed by remote manifolds 44 with the manifold body 101 depicted as placed inside the building; however, it is contemplated that other configurations of manifolds or solutions not using manifolds may be used. It is contemplated that thick panels 90 can also be used in this configuration.

Figure 9:
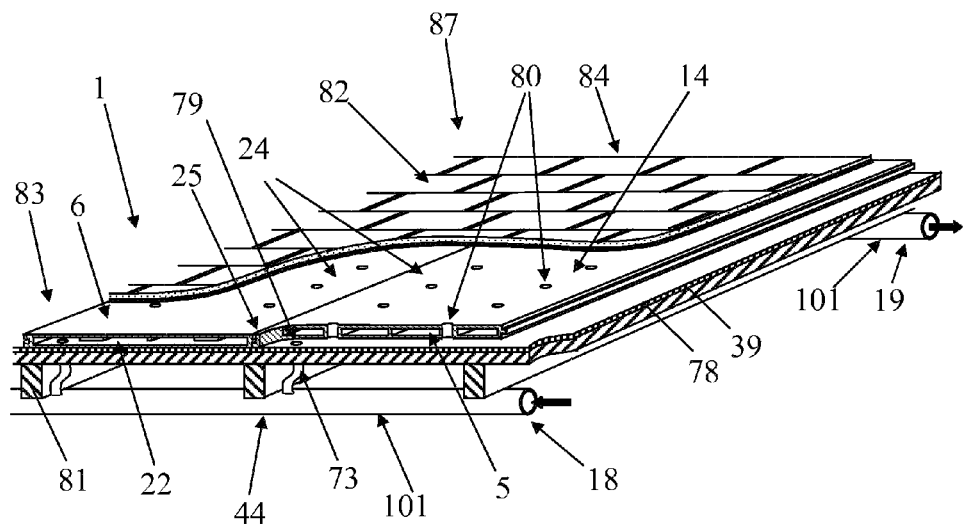
FIG. 9 shows a cutaway perspective view of a roof cladding using the thin panels in the covered configuration integrated into a roof according to an embodiment.

FIG. 9 shows a cutaway perspective view of a roof cladding using thin panels 87 in the covered configuration, where asphalt shingles 82 are used as the covering material. The thin panels 87 function as solar thermal collectors, heat collectors and heat dissipaters. It is contemplated that the micro-channel absorbers 1 constituting the thin panels 87 are made preferably to the exact required length matching the dimensions of the surface to be covered to include the entire insolated area of the roof. This allows for the collection of the maximum amount of solar energy and at the same time minimizes solar gains to the building. Placing the micro-channel absorbers 1 under the roof covering material lowers the efficiency of the solar absorber, but at the same time invisibly integrates the micro-channel absorbers 1 into the roof allowing for increase of the active area collecting solar energy, shields them from the elements and UV radiation, and provides additional thermal mass to the system. The thin panels 87 are placed on the underlayment 78 (roofing felt) that is laid on the roof's substrate 39. The underlayment 78 preferably has a metalized upper side to deflect thermal radiation from the thin panels 87. It is also contemplated that an additional layer of thermal insulation may be placed below the micro-channel absorbers 1 (not shown here). The asphalt shingles 82 are placed on the active surface 6 and nailed to the substrate 39 through clearly marked pierce-able areas 14 or through mounting holes 80 pre-drilled in the body of the micro-channel absorber 1. The depicted embodiment uses remote manifolds 44 in combination with internal manifolds 22. Openings are drilled in the substrate 39 close to the down-slope edge 83 and the ridge 84 of the roof to accommodate the channel connectors 79 and the connecting pipes 73 of the remote manifolds 44, which are used as distribution and collection manifolds 18 and 19. The manifold bodies 101 of the remote manifolds 44 are placed in the attic area below rafters 81. This provides unobstructed access to the manifold bodies 101 and allows sections of the panels to be disconnected in the case of leakage of one of the modular micro-channel sections 24 without the need for removing the roof covering material to replace the malfunctioning part. It is contemplated that internal manifolds, external manifolds or serpentine flow configuration are used instead of the remote manifolds. The modular micro-channel sections 24 are shown here as interlocked by the interlocking fasteners 25; however, use of the modular micro-channel section 24 without any interlocking fasteners 25 is also contemplated. When interlocking fasteners 25 are not used, the modular micro-channel section 24 are placed side by side on the substrate 39, linked together by manifolds and secured in this configuration to the substrate 39 by the shingles' fasteners.

FIG. 9 shows embodiment with the fluid transport channels 5 parallel to the direction of the roof's slope. However, the fluid transport channels 5 are also contemplated to be perpendicular to the roof's slope (not shown) with the manifolds 18 and 19 integrated into the rakes of the roof. It is also contemplated that thin or thick panels in the glazed and the bare configurations (with or without an optically selective coating) are used as the roof covering cladding. When thick panels are used, they can be installed directly on the roof rafters 81 and may not require the substrate 39. Also, FIG. 9 shows the installation to a sloped roof under asphalt shingles; however, it is contemplated that the micro-channel panels are used in flat roofs and under any other roof covering materials. In the case of flat roofs, the micro-channel panels may be adhered to the substrate 39 or substrate underlayment 78 and there may be no need for use of fasteners. The embodiment shown in FIG. 9 is for illustration purposes only; any other combinations of manifolds or roof covering materials are being contemplated.

Figure 10:
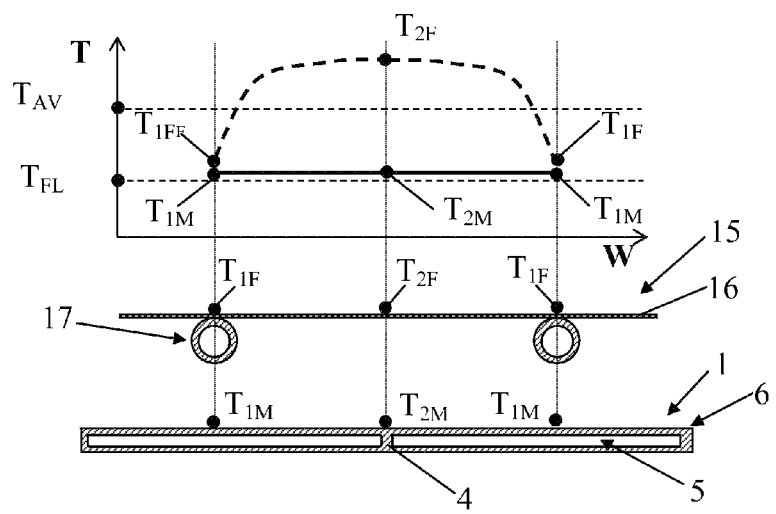
FIG. 10 shows a schematic cross-section and a temperature gradient graph of the "plate and tubes" solar thermal absorber and the micro-channel absorber.

FIG. 10 shows schematic cross-sections of a "plate and tubes" solar absorber 15 and a micro-channel absorber 1. The drawing also shows a graph comparing temperatures across the surface of both types of absorbers, with the "plate and tubes" absorber 15 (dotted line) and the micro-channel absorber 1 (continuous line) having the same temperature of the heat-transfer fluid $T_{FL}$. In the "plate and tubes" absorber 15, the parallel copper riser pipes 17, which are most often spaced 100 mm-250 mm apart, are attached to the absorber sheet 16. The riser pipes 17 collect heat from the absorber sheet 16 and transfer it to the heat-transfer fluid running in the riser pipes 17. Temperature $T_{1F}$ is measured at the point where the absorber sheet 16 is connected to the riser pipe 17. Temperature $T_{2F}$ is measured on the surface of the absorber sheet 16 halfway between two riser pipes 17. As the graph shows, the temperature changes across the absorber sheet 16 and has its maximum $T_{2F}$ in the middle of the distance between the riser pipes 17, and minimum $T_{1F}$ at the riser pipes 17. For the micro-channel absorber 1, temperature $T_{1M}$ is measured on the active surface 6 at the point located in the middle of width of the fluid transport channel 5. Temperature $T_{2M}$ is measured in the junction point of the micro-channel wall 4 and active surface 6. The temperature across the micro-channel absorber 1 is shown as being constant and lower than the averaged temperature $T_{AV}$ of the "plate and tubes" absorber 15.

For any thermal collector, the efficiency n decreases as the operating temperature of an absorber increases. This is described by the following equation, which defines the efficiency of a solar thermal collector:

$$n = n_o - [U(T_{abs} - T_{amb})/I]$$

Where: n=efficiency of thermal collector; $n_o$=optical efficiency; $T_{abs}$=absorber temperature; $T_{amb}$=ambient temperature; U=collector heat loss coefficient (U depends on temperature; however, a constant value gives a good approximation, especially for low temperature absorbers); and I=solar irradiance on collector aperture.

The above equation allows for a comparison of thermal efficiency of the "plate and tubes" absorber 15 and the micro-channel absorber 1 according to the embodiment. Due to the lower absorber temperature $T_{abs}$ for the micro-channel absorber 1, the thermal efficiency of the micro-channel absorber 1 will be higher than that of "plate and tubes" absorber 15 with equal solar irradiance on the collector aperture I, optical efficiency $n_o$, and ambient temperature $T_{amb}$ for both the "plate and tubes" absorber 15 and the micro-channel absorber 1, and assuming that the collector heat loss coefficient U is equal for both "plate and tubes" absorber 15 and micro-channel absorber 1. The lower temperature of the absorber's surface translates to better efficiency of the micro-channel absorber 1 due to lower losses from emittance and convection (assuming that conduction losses are negligible due to proper insulation). Also, the responsiveness of the micro-channel absorber 1 to changes in the insulation is higher.

Figure 11:
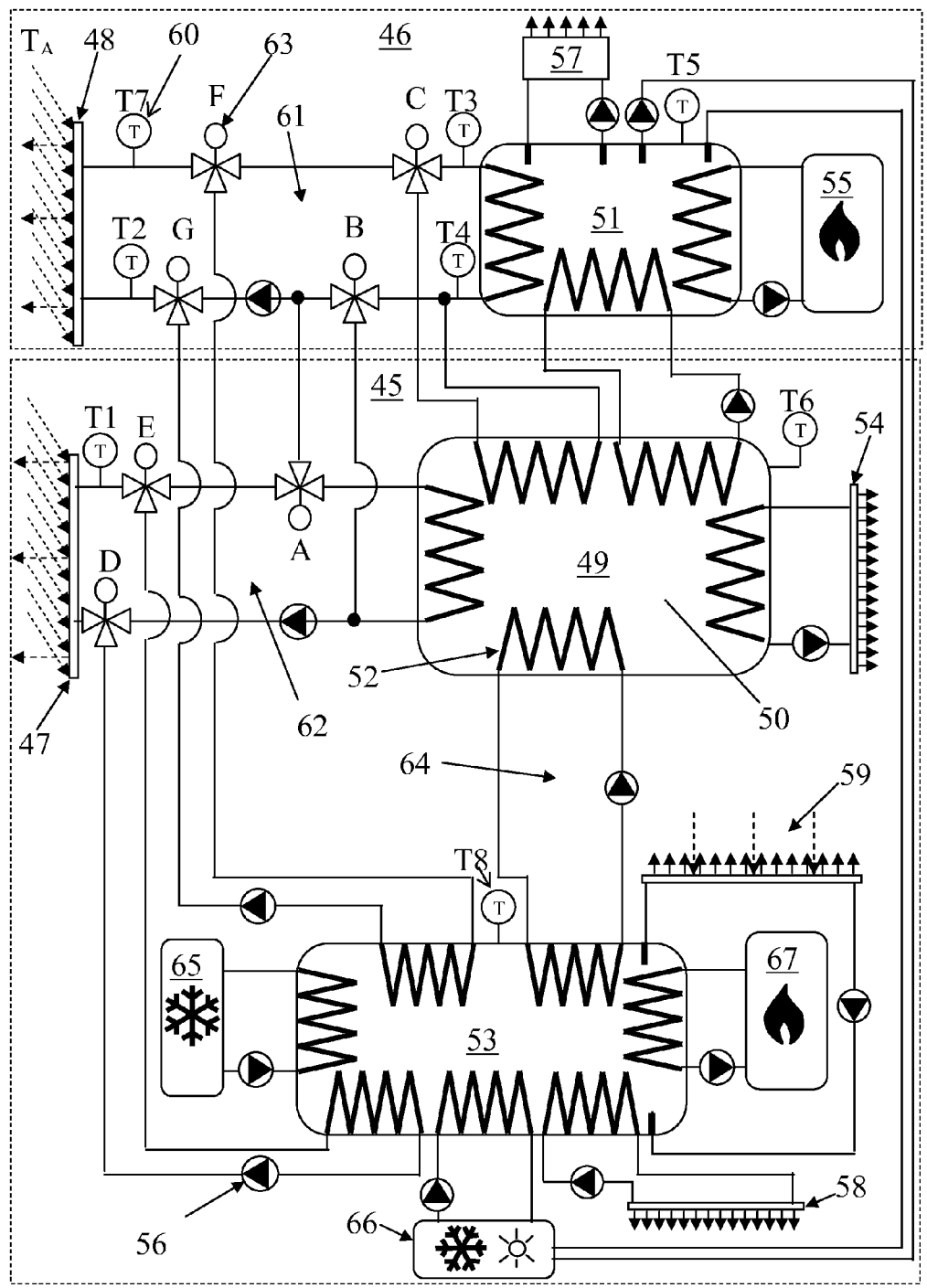
FIG. 11 shows a diagram of an embodiment of the building thermal energy management system using micro-channel absorbers.

FIG. 11 shows a diagram of an embodiment of the building thermal energy management system assembled using micro-channel absorbers according to an embodiment that (a) collects solar energy, (b) collects thermal energy from the external building envelope (c) lowers the building's solar gains by cooling the building's external envelope and providing additional thermal insulation, (d) accumulates the solar energy for further use, (e) provides thermal energy by use of solar and conventional sources of energy, for hot water, chilling, space heating or cooling, and technological heat, (f) provides a means of heating and cooling and heats and cools the internal space of the building, and (g) dissipates excess thermal energy. The diagram is simplified to show the main components of the system and modes of their operation. All elements that are not significant to the explanation of the system's embodiment are deliberately omitted for clarity of the drawing. It should be noted that the shown diagram may include additional and/or alternative components not represented in FIG. 11.

Due to the large area of the micro-channel absorbers working as solar absorbers integrated into the external walls and roof of the building, and the limited daily use of the collected thermal energy, there is no need to use high efficiency solar thermal absorbers across the entire building envelope. Thus, the system is divided into two separate areas: low temperature zone 45 and high temperature zone 46. Micro-channel absorbers working during the day as solar absorbers for the high temperature zone 46 are located in the area receiving the most solar radiation. These high temperature zone solar absorbers 48, the main role of which is achieving high temperature of the heat-transfer fluid, are integrated in the areas where there is the highest insulation of the building's envelope. Additionally, to increase the efficiency of these high temperature zone solar absorbers 48, they may be: (a) covered by a covering material that efficiently absorbs solar energy (having a different color and/or texture than the rest of the façade), (b) glazed as described in above, (c) installed without any layer of covering material, but with an optically selective coating. During the night, the same high temperature zone solar absorbers 48 are meant to work as heat dissipaters.

Micro-channel absorbers working during the day as solar absorbers for the low temperature zone 45 cover the remaining area of the building external envelope exposed to sunlight. The thermal efficiency of these low temperature zone solar absorbers 47 may be much lower than the efficiency of the high temperature zone solar absorbers 48 because their main role is cooling the building's external envelope during the day. The area covered by the low temperature zone solar absorbers 47 may be much larger than the area of the high temperature zone solar absorbers 48, depending on the thermal balance of the building. During the night, the same low temperature zone solar absorbers 47 are meant to work as heat disseminators.

The solar energy absorbed by the low temperature zone solar absorbers 47 is stored in the primary storage device 49 that has a large heat capacity. The primary storage device 49 has to be well insulated and contains a storage substance 50 that has favorable thermal storage properties, such as salt, brine, wax or any other material used for heat storage. It is also contemplated that the building's foundation and surrounding ground or underground natural structures, such as caverns filled with water or mineral deposits, are used for storage capacity. The primary storage device 49 is connected, preferably through heat exchangers 52 to: (a) the high temperature zone solar absorbers 48, (b) the low temperature zone solar absorbers 47, (c) the high temperature storage 51, (d) low temperature storage 53, and (e) the primary heat sink system 54.

The high temperature storage 51 contains the heat-transfer fluid, preferably uses fluid stratification, and is preferably connected through heat exchangers 52 to: (a) the high temperature zone solar absorbers 48, (b) the primary storage device 49, (c) the high temperature conventional heat source 55 (a fossil fuel or electric boiler, or a heat pump, or any other source of energy) working as a backup heat source. The heat-transfer fluid from the high temperature storage 51 is pumped by pump 56 to supply heat for preparing domestic hot water, and to provide technological heat (these two systems are depicted on the diagram as the high temperature receiving devices 57), and also pumped by a pump 56 to the solar chiller 66 servicing the low temperature storage 53.

The low temperature storage 53 contains heat-transfer fluid, it preferably uses fluid stratification, and is preferably connected through heat exchangers 52 to: (a) the high temperature zone solar absorbers 48, (b) the conventional cold source 65 (that may be a chiller powered by electric current or a fossil fuel, or any other source of energy) working as a backup cold source, (c) the low temperature zone solar absorbers 47, (d) the solar chiller 66 (the adsorption or absorption chiller powered by hot heat-transfer fluid), (e) the low temperature heat sink 58, (f) the low temperature conventional heat source 67 (that may be a fossil fuel or electric boiler, or a heat pump, or any other source of energy) working as a backup heat source and may be the one heat source also used as high temperature conventional heat source 55 (this combination is not depicted by the diagram), and (g) the primary storage device 49. The heat-transfer fluid from the low temperature storage 53 is circulated through the heating and cooling installation 59 (depicted in this diagram as one element for simplicity of the drawing) by a pump 56.

The primary heat sink system 54 is used to disseminate excessive energy accumulated in the primary storage device 49 during high insulation periods. The primary heat sink system 54 may be in the form of a natural or man made body of water (including underground waters), ground, or the heat may be distributed to other buildings or objects to satisfy their thermal needs. The low temperature heat sink 58 has to be capable of dissipating low temperature heat. Preferably, the heat sink may be constituted of the surrounding ground or a natural or man made body of water (including underground waters). The means of cooling the low temperature heat sink 58 may also be shared with the primary heat sink system 54 (not depicted).

The system also preferably contains temperature sensors 60 and the main control unit (not depicted here) that monitors and directs the system. It is contemplated that to achieve higher temperatures of the heat-transfer fluid in the solar collector low temperature zone 45 and solar collector high temperature zone 46 the zones are further divided into sub zones. The control unit manages the flow of the heat-transfer fluid separately in each sub zone to adapt to changes of building's insulation during the day, eventually switching the flow of the heat-transfer fluid between different sub zones to achieve higher end temperatures of the heat-transfer fluid. The control unit may be connected to a software system (via hard wire or wireless connectivity) which automatically manages and adjusts the flow of the heat-transfer fluid to each sub zone.

There are four main scenarios describing how the system works: (a) hot season during the day time, (b) hot season during the night time, (c) cold season during the day time, and (d) cold season during the night time. The four scenarios are described below. During the day in the hot season, the system: (a) collects solar energy at the envelope of the building and thus protects the inside of the building from solar gains, (b) accumulates a portion of the collected solar energy, (c) provides thermal energy to high temperature receiving devices 57 (for hot water and technological heat) and solar chiller 66, (d) cools the internal space of the building by running the cold heat-transfer fluid from the low temperature storage 53 through the heating and cooling installation 59 collecting excess energy inside the building, and (e) disposes excess heat through the heat sinks 54 and 58.

The low temperature zone solar absorbers 47 absorb the solar energy and heat the heat-transfer fluid. When temperature T1 is higher than T6, the pump 56 starts circulating the heat-transfer fluid through the heat exchanger 52 built into the primary storage device 49. The heat is transferred to the primary storage device 49 and the cooled heat-transfer fluid goes back to the low temperature zone solar absorbers 47.

The high temperature zone solar absorbers 48 absorb the solar energy and heat the heat-transfer fluid. When temperature T7 is higher than temperature T5, the pump 56 starts circulating the heat-transfer fluid through the heat exchanger 52 built into the high temperature storage 51. The heat is transferred to high temperature storage 51 and the cooled heat-transfer fluid goes back to the high temperature zone solar absorbers 48. When the requirement for heat is high in the high temperature storage 51, temperature T2 in the high temperature loop 61 may be lower than temperature T1 in the low temperature loop 62. If temperature T1 is higher than T2, automatic 3-way valves 63 A and B are set to direct heat-transfer fluid from the low temperature loop 62 to the high temperature loop 61 for further heating. When additional heat in the high temperature storage 51 is not required, temperature T3 will equal T4 and the automatic 3-way valve 63 C opens to allow heat to be transferred to the primary storage device 49 through the heat exchanger 52. If temperature T6 indicates that primary storage device 49 is close to its capacity, the pump 56 in the primary heat sink system 54 starts working to dispose of the excessive energy.

When the sun is shaded and temperature T3 is lower than T5 and T1 is lower than T6 pumps 56 in the high temperature loop 61 and low temperature loop 62 are stopped to prevent heat loss from the storages 49 and 51. When temperature T5 becomes lower than temperature T6, pump 56 in the circuit between the primary storage device 49 and high temperature storage 51 starts to circulate heat-transfer fluid to transfer heat to the high temperature storage 51. When temperature T5 goes below the required value the high temperature conventional heat source 55 is switched on.

The pump 56 in the loop of the heating and cooling installation 59 circulates cold heat-transfer fluid from the low temperature storage 53 through the heating and cooling installation 59 to absorb excess energy from the internal space of the building (using cooling devices). The heat-transfer fluid is cooled in the low temperature storage 53 by the heat exchangers 52 connected to the solar chiller 66 (powered by the heat from the high temperature storage 51) and the low temperature heat sink 58. In the case that the solar chiller 66 and the low temperature heat sink 58 are not capable of cooling the low temperature storage 53 to the required temperature, the conventional cold source 65 is started. The cooled heat-transfer fluid is then pumped back to the heating and cooling installation 59 to extract heat from the internal space of the building.

During the night in a hot season, the system: (a) cools the internal space of the building by running the cold heat-transfer fluid from the low temperature storage 53 through the heating and cooling installation 59 collecting excess energy inside the building, (b) provides thermal energy to high temperature receiving devices 57, (c) provides thermal energy to the solar chiller 66, (d) removes excess heat from the system through means of solar chiller 66 or the conventional cold source 65, (e) disposes excess heat through the low and high temperature zone solar absorbers 47 and 48, and (f) disposes excess heat through the heat sinks 54 and 58.

The heating and cooling installation 59 functions as in the daily cycle collecting heat from the inside of the building. If the ambient temperature $T_A$ outside the building is lower than the temperature T8 in the low temperature storage 53, then the low and high temperature zone solar absorbers 47 and 48 are used as heat disseminators. The 3-way valves 63 D and E in the low temperature loop 62 direct the heat-transfer fluid through the low temperature zone solar absorbers 47 and pump 56 starts working. Also, the 3-way valves 63 F and G in the high temperature loop 61 direct the heat-transfer fluid through the high temperature zone solar absorbers 48 and pump 56 starts working. If the ambient temperature $T_A$ outside the building is higher than temperature T8, the low temperature heat sink 58, the solar chiller 66, or the conventional cold source 65 disseminate the excess heat.

If required, the primary storage device 49 may be cooled during the night through the low and high temperature zone solar absorbers 47 and 48 if temperature $T_A$ outside the building is lower than temperature T6. This can be done by circulating water through the low temperature loop 62 and also through the high temperature loop 61 with the proper setting of 3-way valve 63 C.

When the temperature T5 in the high temperature storage 51 becomes lower than temperature T6 in the primary storage device 49, pump 56 in the circuit between the storages 49 and 51 starts to circulate heat-transfer fluid and transfers heat to the high temperature storage 51. When temperature T5 goes below required value the high temperature conventional heat source 55 is switched on.

During the day in a cold season, the system: (a) collects solar energy at the envelope of the building, (b) heats the internal space of the building by running the hot heat-transfer fluid through the heating and cooling installation 59, (c) provides energy to high temperature receiving devices 57, and (d) accumulates a portion of the collected solar energy.

When the sun is shining, the low temperature zone solar absorbers 47 absorb the solar energy and heat the heat-transfer fluid. When temperature T1 is higher than temperature T8 in the low temperature storage 53, the 3-way valves 63 D and E are set to open the path to the heat exchanger 52 in the low temperature storage 53 and pump 56 starts circulating the heat-transfer fluid through the heat exchanger 52. The high temperature zone solar absorbers 48 may provide heat to the high temperature storage 51 as described previously, or support the low temperature storage 53. The second option is more viable due to the lower temperature T8 required for the heating and cooling installation 59 to work. The 3-way valves 63 F and G are set to open the path through the low temperature storage 53 and pump 56 starts working. If temperature T8 in the low temperature storage 53 is too low, and the temperature T8 is lower than temperature T6 in the primary storage device 49, the heat is transferred from the primary storage device 49 to the low temperature storage 53 using the primary to low storage loop 64. If the temperature T8 is still lower than required for the heating and cooling installation 59, the low temperature conventional heat source 67 is switched on. In the high temperature receiving devices 57 loop, when the temperature T5 in the high temperature storage 51 is lower than required for the high temperature receiving devices 57, the high temperature conventional heat source 55 is switched on. When the sun is shaded, both the high temperature storage 51 and low temperature storage 53 use energy from the primary heat storage device 49 through the corresponding loops or use the conventional heat sources 55 and 67. During the night in a cold season, the system: (a) heats the internal space of the building through heating and cooling installation 59 using heat accumulated in the primary storage device 49 and low temperature conventional heat source 67, and (b) provides energy to the high temperature receiving devices 57 using high temperature conventional heat source 55.

Different parts of the described system can be used independently. For example, in the simplest embodiment of the system, the building's roof is cooled by the micro-channel absorbers acting as solar thermal collectors while heating a swimming pool during the day and at the same time limiting solar gains to the internal space of the building. During the night, the same micro-channel absorbers are used as heat dissipaters to remove excessive thermal energy from the pool.

Although the above has been described and illustrated in detail, it is to be clearly understood that the same is by way of illustration and example, and is not to be taken by way of limitation. It may be further understood by those skilled in the art that the forgoing description is a preferred embodiment of the disclosed device and that various changes and modifications may be made without departing from the spirit and scope. Accordingly, it is expressly intended that all such variations, changes and equivalents, which fall within the spirit and scope of the description, be embraced thereby.

What is claimed is:

1. An insulated solar-thermal panel assembly comprising:
   a back sheet of structural material configured to mount to and be in contact with an existing building structure;
   a core material layer having a surface abutting a surface of the back sheet of structural material, said core material layer providing thermal insulation properties and stiffness to the solar-thermal panel assembly; and
   a micro-channel absorber comprising:
      a back plate having a surface abutting a surface of the core material;
      an active plate adjacent to the back plate;
      an opaque solar radiation absorptive layer for converting solar energy into thermal energy, the opaque solar radiation absorptive layer is made of an opaque exterior finishing material configured to serve as a finished exterior of the building structure;
         wherein an active surface of the active plate continuously abuts a surface of the opaque solar absorptive layer;
      a plurality of channel walls integrally formed with the back plate and the active plate,
         each of the channel walls extending between the back plate and the active plate to define a plurality of fluid transport channels formed in-between the active plate and the back plate, and
         each of the channel walls defining a sidewall of two adjacent fluid transport channels; and
      an inlet port and an outlet port each of which is coupled to the plurality of fluid transport channels; and
      at least one interlocking fastener for modular assembly with another micro-channel absorber;
      wherein solar energy penetrates the solar radiation absorptive layer and is converted into thermal energy that travels to fluid being pumped along the fluid transport channels to simultaneously heat the fluid and remove heat from the solar absorptive layer.

2. The insulated solar-thermal panel assembly of claim 1, wherein the opaque exterior finishing material is synthetic stucco.

3. The insulated solar-thermal panel assembly of claim 1, wherein the opaque exterior finishing material is natural or man-made stone.

4. The insulated solar-thermal panel assembly of claim 1, wherein the opaque exterior finishing material is roof covering material.

5. The insulated solar-thermal panel assembly of claim 1, wherein the core material is made of a three-dimensional structure made of metal, plastic, or paper.

6. The insulated solar-thermal panel assembly of claim 1, wherein the core material layer is made of insulating rigid foam.

7. The insulated solar-thermal panel assembly of claim 1 wherein the micro-channel absorber is a first micro-channel absorber, the panel further comprising:
   a second micro-channel absorber coupled to the first micro-channel absorber, the second micro-channel absorber comprising:
      an activate plate;
      a back plate adjacent to the active plate, wherein the active plate is covered by a solar radiation absorptive layer that faces outside of the structural panel; and
      an inlet port and an outlet port and plurality of fluid transport channels formed in-between the active plate and the back plate that are coupled to the inlet and outlet ports, wherein fluid travels between the first and second micro-channel absorbers.

8. The insulated solar-thermal panel assembly of claim 1, further comprising:
   a fluid storage element coupled to the assembly, wherein the fluid storage element stores heated fluid received from at least one output port; and
   a pump coupled to the fluid storage element, wherein the pump provides the heated fluid to one or more desired fluid output ports interior or exterior to the building structure.

9. The insulated solar-thermal panel assembly of claim 1, wherein the micro-channel absorber is made of a metal or metal alloy.

10. The insulated solar-thermal panel assembly of claim 1, wherein the insulated solar-thermal panel assembly is mounted to an outer wall of the building structure and configured to function as a building structural element.

11. The insulated solar-thermal panel assembly of claim 1, wherein the insulated solar-thermal panel assembly is directly attached to a load bearing element of the building structure.

12. The insulated solar-thermal panel assembly of claim 1, wherein the solar thermal panel assembly is attached to a roof of the building structure.

13. The insulated solar-thermal panel of claim 1, wherein each of the plurality of fluid transport channels is in fluid communication with at least one other of the plurality of fluid transport channels.

14. The insulated solar-thermal panel of claim 1, wherein the micro-channel absorber is made of one of plastic and plastic composite.

15. An insulated solar-thermal panel assembly comprising:
   a structural panel attached to a building structure;
   a core material layer having a surface abutting a surface of the structural panel;
   a micro-channel absorber comprising:
      an active plate;
      a back plate adjacent to the active plate having a surface abutting a surface of the core material, wherein the active plate is covered by an opaque solar radiation absorptive layer for converting solar energy into thermal energy, the opaque solar radiation absorptive layer is made of an exterior finishing material;
      an active surface of the active plate continuously abuts a surface of the opaque solar absorptive layer;
      a plurality of channel walls integrally formed with the back plate and the active plate,
         each of the channel walls extending between the back plate and the active plate to define a plurality of fluid transport channels formed in-between the active plate and the back plate, and
         each of the channel walls defining a sidewall of two adjacent fluid transport channels;
      an inlet port and an outlet port each of which is coupled to the plurality of fluid transport channels; and
      at least one interlocking fastener for modular assembly with another micro-channel absorber;
      wherein solar energy penetrates the active plate and travels to fluid flowing along the fluid transport channels to at least remove heat from the solar radiation absorptive layer.

16. The insulated solar-thermal panel of claim 15, wherein each of the plurality of fluid transport channels is in fluid communication with at least one other of the plurality of fluid transport channels.

17. The insulated solar-thermal panel of claim 15, wherein the micro-channel absorber is made of one of plastic and plastic composite.

* * * * *